(12) United States Patent
Fujita et al.

(10) Patent No.: US 11,720,010 B2
(45) Date of Patent: Aug. 8, 2023

(54) LIGHT SOURCE DEVICE AND PROJECTION DEVICE

(71) Applicants: Kazuhiro Fujita, Tokyo (JP); Yohei Takano, Kanagawa (JP); Makoto Hirakawa, Tokyo (JP); Shigeaki Imai, Kanagawa (JP)

(72) Inventors: Kazuhiro Fujita, Tokyo (JP); Yohei Takano, Kanagawa (JP); Makoto Hirakawa, Tokyo (JP); Shigeaki Imai, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 17/539,204

(22) Filed: Dec. 1, 2021

(65) Prior Publication Data

US 2022/0179298 A1      Jun. 9, 2022

(30) Foreign Application Priority Data

Dec. 7, 2020   (JP) ................................. 2020-202828
Oct. 7, 2021   (JP) ................................. 2021-165571

(51) Int. Cl.
  *G03B 21/20*     (2006.01)
  *H04N 9/31*      (2006.01)
  (Continued)

(52) U.S. Cl.
  CPC ......... *G03B 21/204* (2013.01); *G02B 26/008* (2013.01); *G02B 27/141* (2013.01);
  (Continued)

(58) Field of Classification Search
  CPC .............. G03B 21/204; G03B 21/2013; G03B 21/2066; G03B 21/208; H04N 9/3158;
  (Continued)

(56) References Cited

U.S. PATENT DOCUMENTS

2012/0268503 A1*  10/2012  Sugiyama ............ H04N 9/3161
                                                              362/84
2014/0036241 A1    2/2014  Nishimori et al.
(Continued)

FOREIGN PATENT DOCUMENTS

JP        2019-184628      10/2019
JP        2022-040809 A    3/2022

*Primary Examiner* — Ryan D Howard
(74) *Attorney, Agent, or Firm* — Xsensus LLP

(57) ABSTRACT

A light source device includes a light source, a plurality of wavelength conversion units, and a plurality of optical systems. The plurality of wavelength conversion units each includes a wavelength conversion region configured to receive light emitted from the light source and emit light with a wavelength different from a wavelength of the received light. The plurality of optical systems are configured to form images of wavelength conversion regions of the plurality of wavelength conversion units. The light source is configured to irradiate the wavelength conversion units with light at a same timing. The plurality of optical systems are configured to cause the images of the wavelength conversion regions of the plurality of wavelength conversion units to be adjacent to or superimposed on each other.

20 Claims, 25 Drawing Sheets

(51) Int. Cl.
*G02B 26/00* (2006.01)
*G02B 27/14* (2006.01)

(52) U.S. Cl.
CPC ....... *G03B 21/208* (2013.01); *G03B 21/2013* (2013.01); *G03B 21/2066* (2013.01); *H04N 9/3158* (2013.01); *H04N 9/3161* (2013.01)

(58) Field of Classification Search
CPC ... H04N 9/3161; H04N 9/3164; H04N 9/3152
See application file for complete search history.

(56) References Cited

U.S. PATENT DOCUMENTS

| | | |
|---|---|---|
| 2014/0049755 A1 | 2/2014 | Nishimori et al. |
| 2014/0071182 A1 | 3/2014 | Takahashi et al. |
| 2014/0071407 A1 | 3/2014 | Takahashi et al. |
| 2014/0211170 A1* | 7/2014 | Kitano ................ G03B 21/204 353/31 |
| 2014/0240679 A1 | 8/2014 | Nishimori et al. |
| 2014/0240680 A1 | 8/2014 | Nishimori et al. |
| 2014/0268069 A1 | 9/2014 | Takahashi et al. |
| 2015/0042963 A1 | 2/2015 | Nishimori et al. |
| 2015/0131062 A1 | 5/2015 | Nishimori et al. |
| 2015/0253653 A1 | 9/2015 | Fujita et al. |
| 2015/0316840 A1 | 11/2015 | Maeda et al. |
| 2016/0103387 A1 | 4/2016 | Nishimori et al. |
| 2016/0109221 A1 | 4/2016 | Takahashi et al. |
| 2016/0223892 A1 | 8/2016 | Takahashi et al. |
| 2016/0349606 A1 | 12/2016 | Nishimori et al. |
| 2016/0377969 A1 | 12/2016 | Nishimori et al. |
| 2017/0299953 A1 | 10/2017 | Maeda et al. |
| 2019/0129288 A1 | 5/2019 | Maeda et al. |
| 2019/0302589 A1* | 10/2019 | Abe ................ G03B 21/2073 |
| 2019/0304402 A1 | 10/2019 | Suzuki et al. |
| 2020/0064719 A1 | 2/2020 | Nakamura et al. |
| 2020/0201158 A1 | 6/2020 | Maeda et al. |
| 2020/0301260 A1 | 9/2020 | Takano et al. |
| 2020/0301266 A1 | 9/2020 | Nakamura et al. |
| 2021/0116707 A1 | 4/2021 | Hirakawa et al. |
| 2021/0136336 A1 | 5/2021 | Takano et al. |
| 2021/0173290 A1 | 6/2021 | Takano et al. |
| 2021/0200075 A1 | 7/2021 | Nakamura et al. |
| 2022/0066177 A1 | 3/2022 | Takano et al. |
| 2022/0171267 A1 | 6/2022 | Takano et al. |
| 2022/0171268 A1 | 6/2022 | Hirakawa et al. |

* cited by examiner

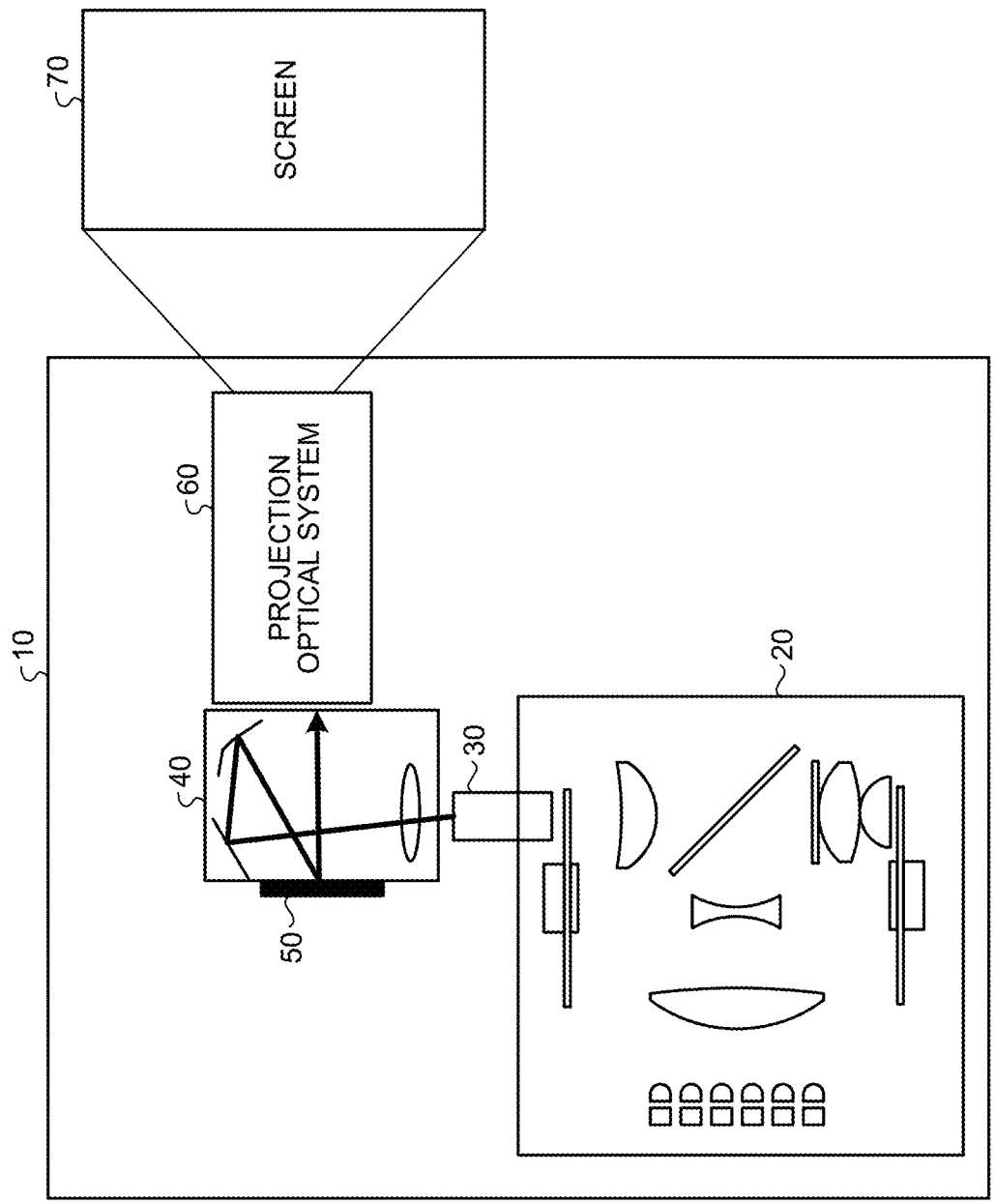

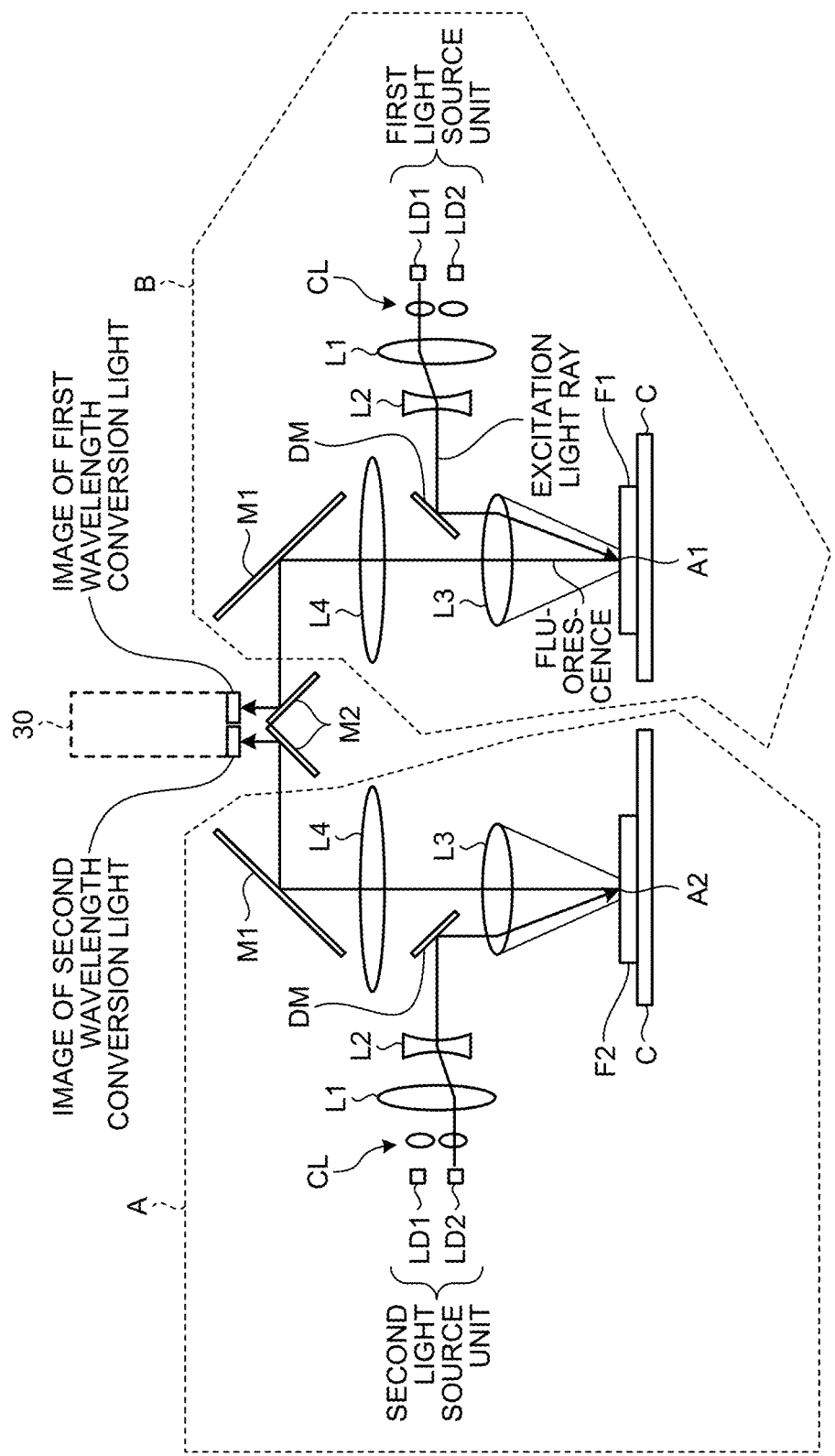

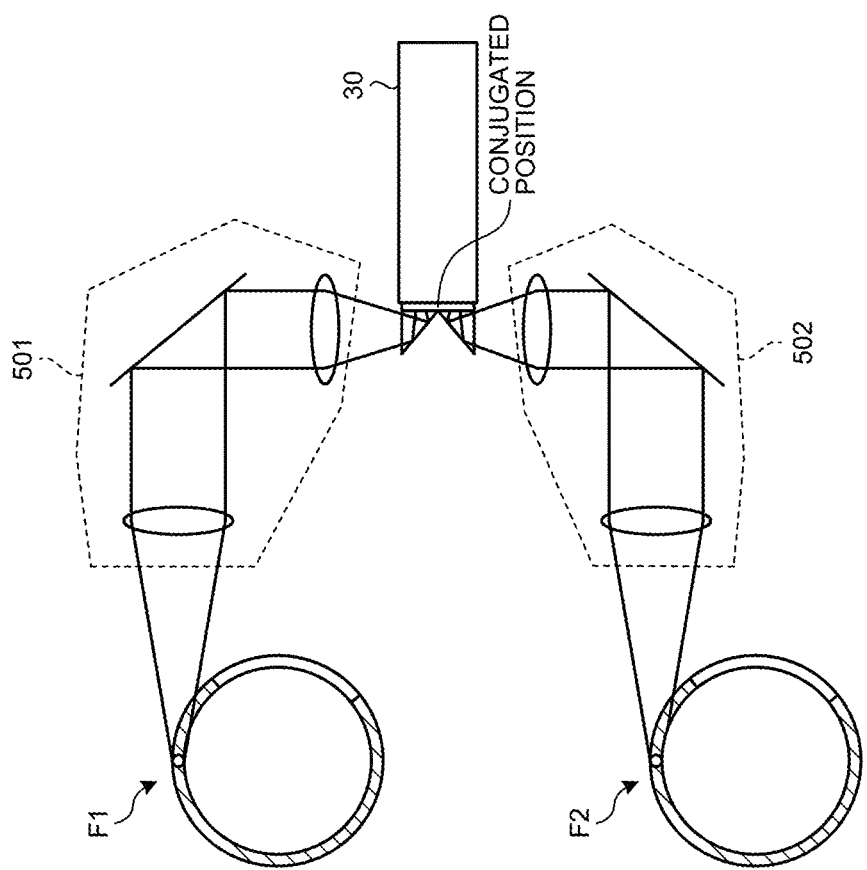
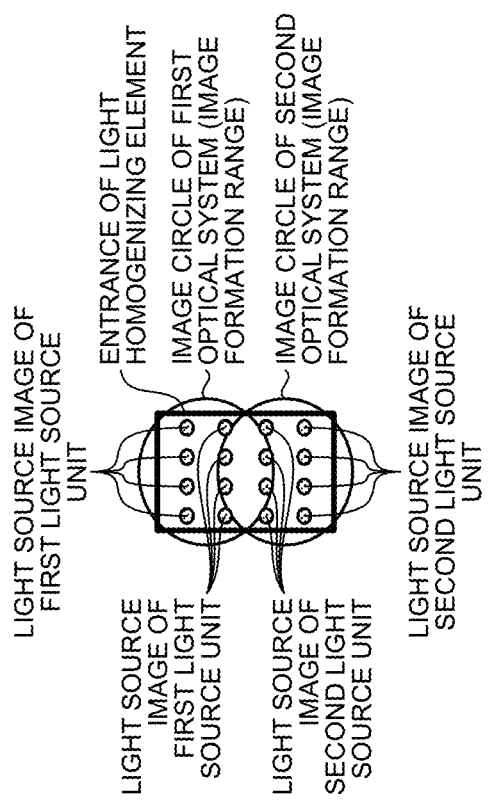
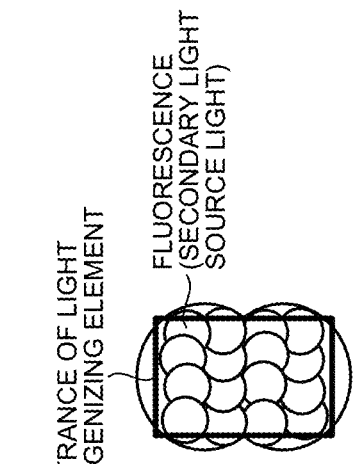
FIG.5A
FIG.5B
FIG.5C

FIG.6
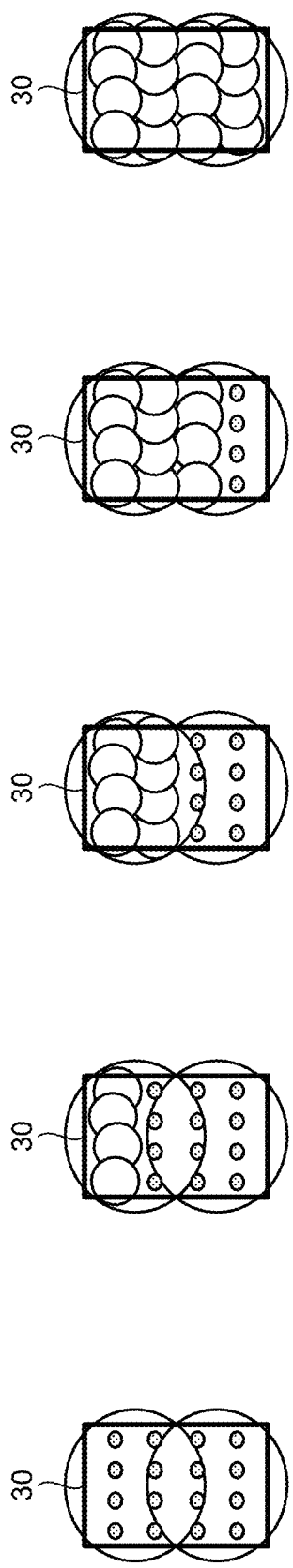
(a) WHEN FLUORESCENCE IS NOT DIVIDED
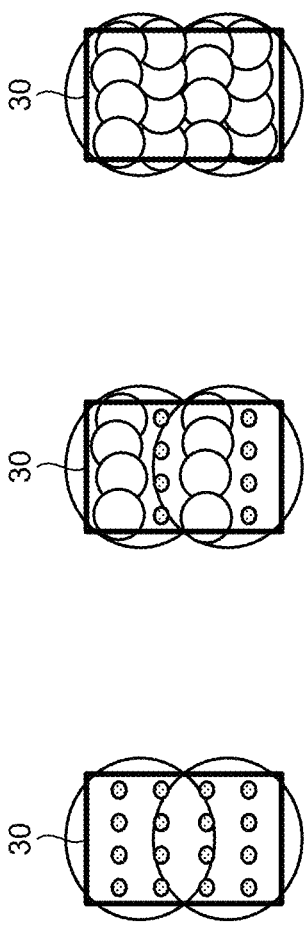
(b) SYNCHRONIZING ILLUMINATION TIMINGS OF FLUORESCENT WHEELS SHORTENS SPOKE TIME

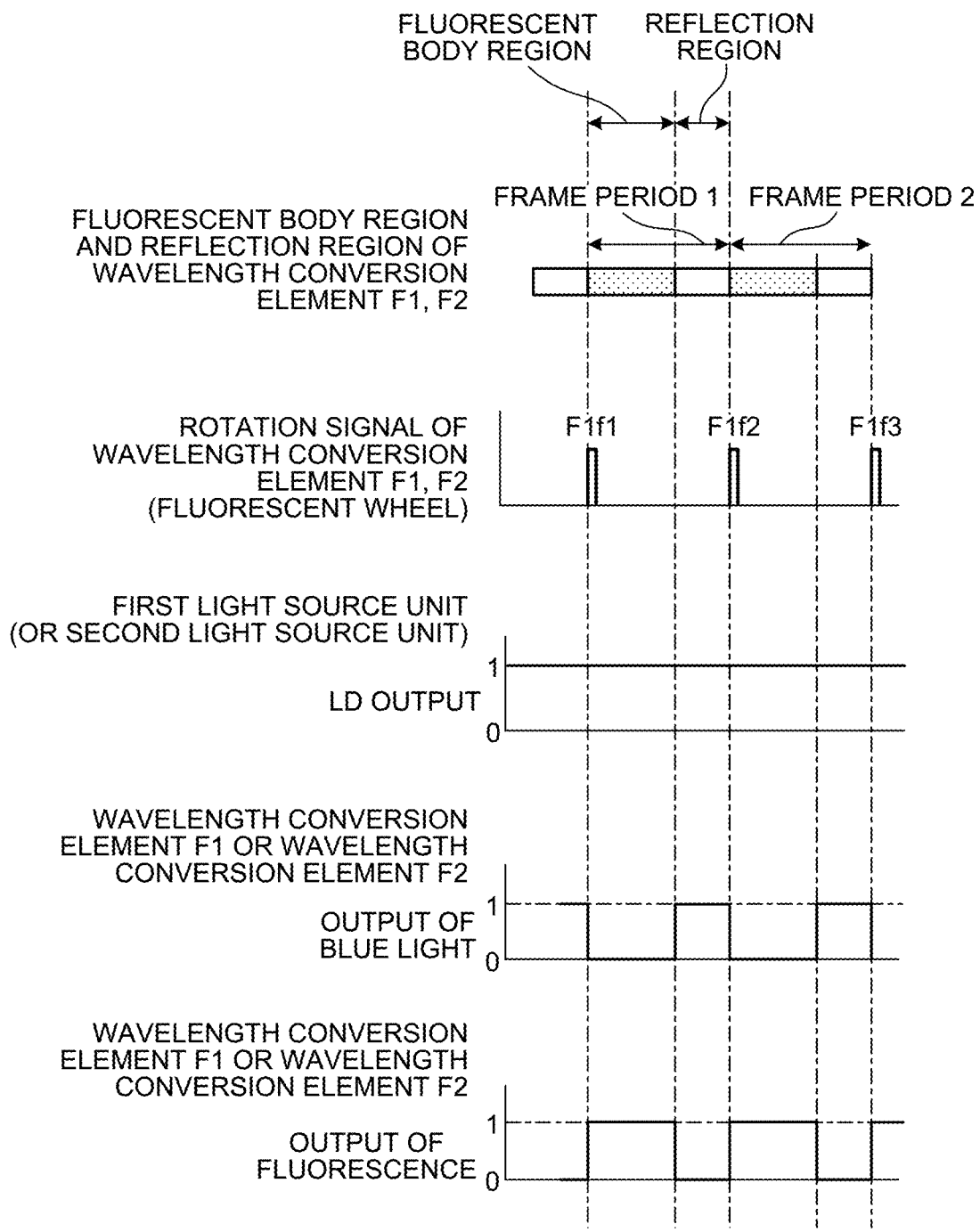

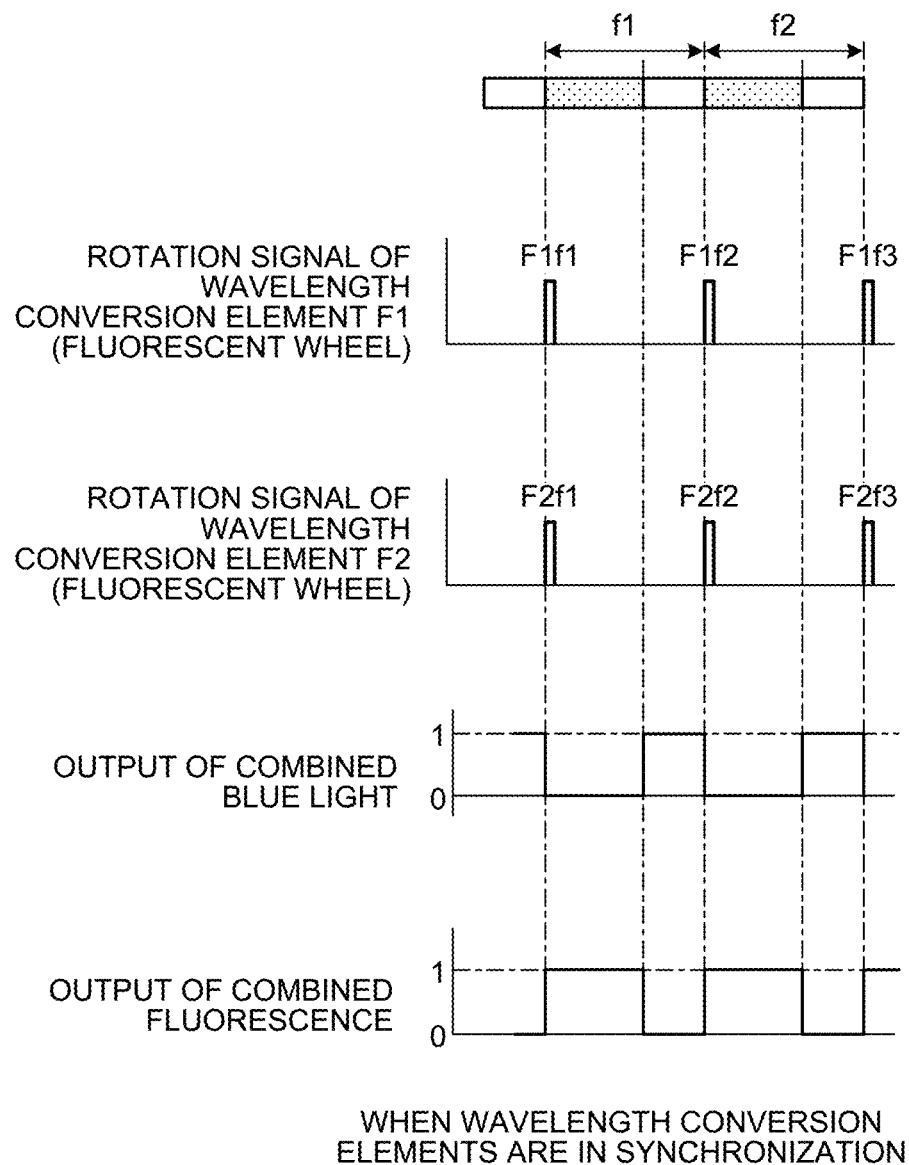

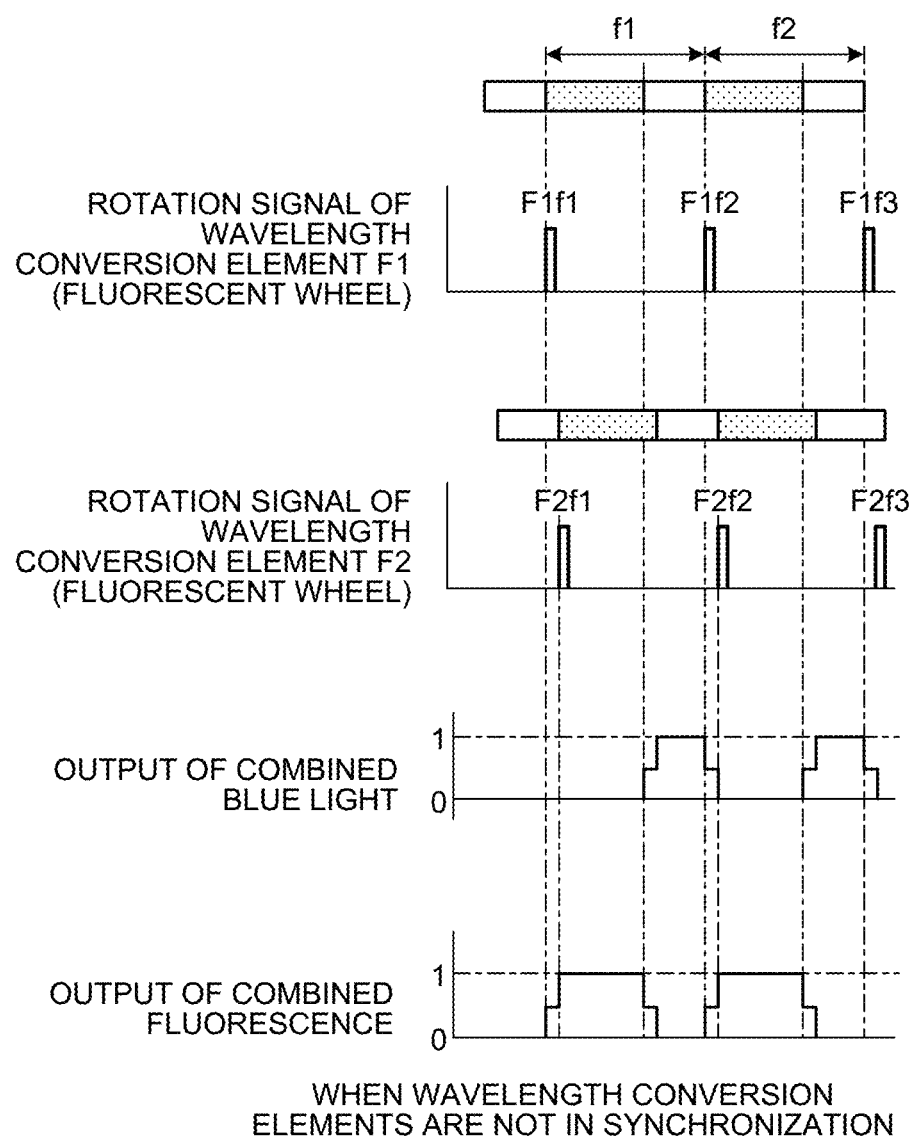

FIG.8A
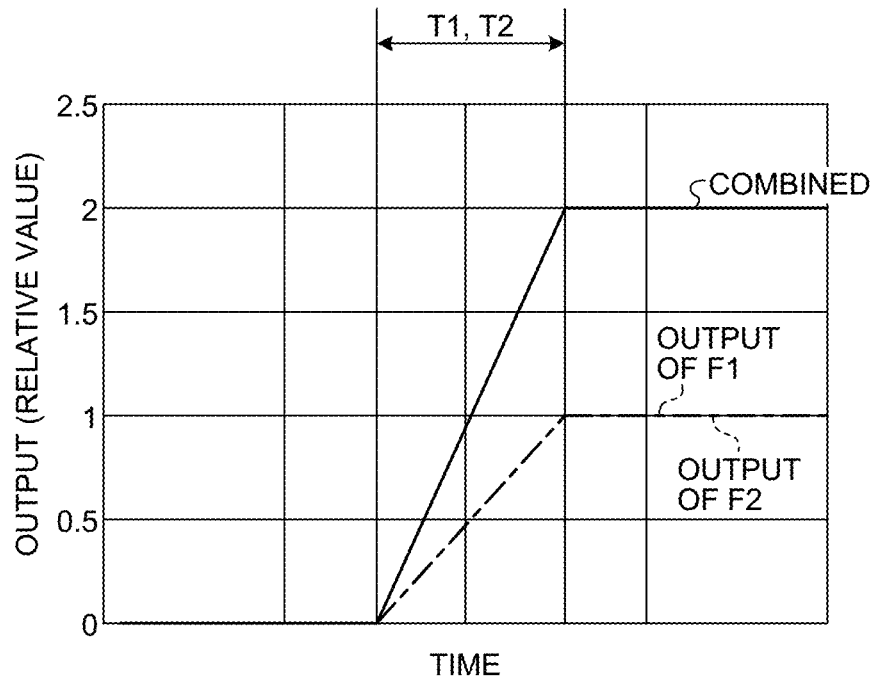
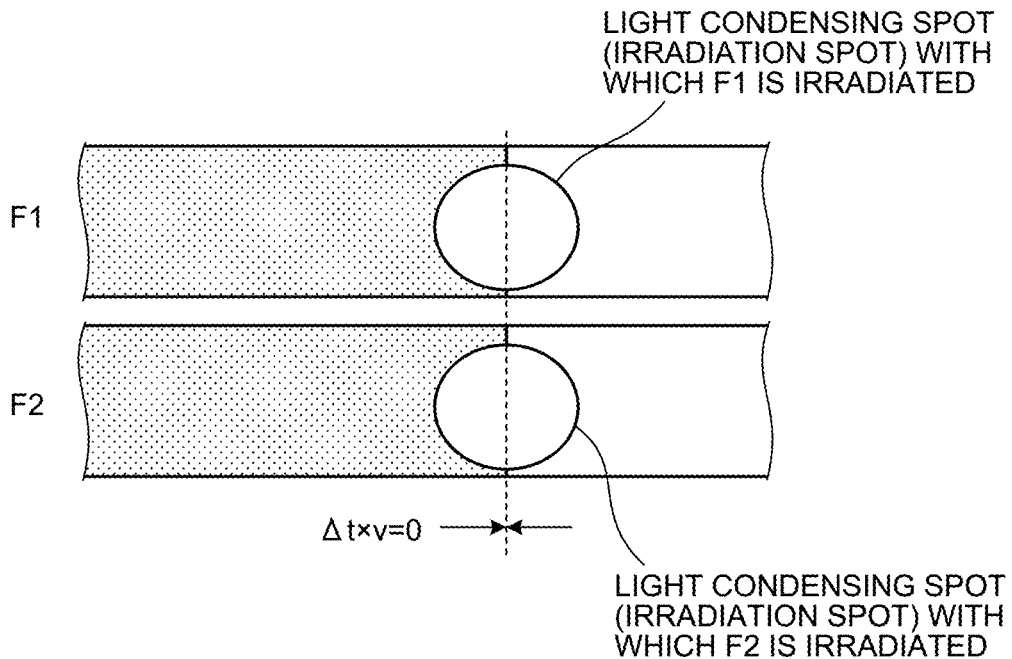

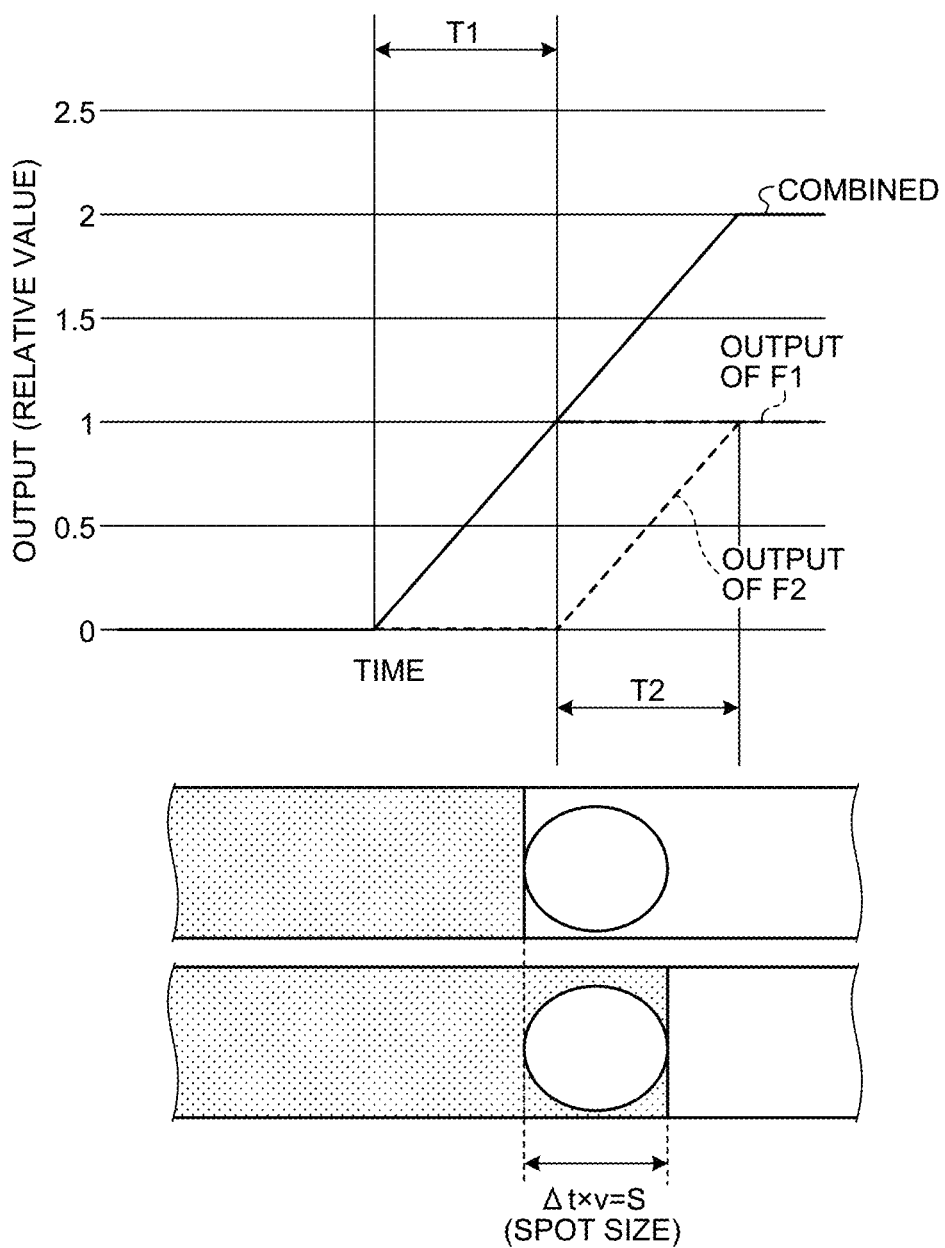

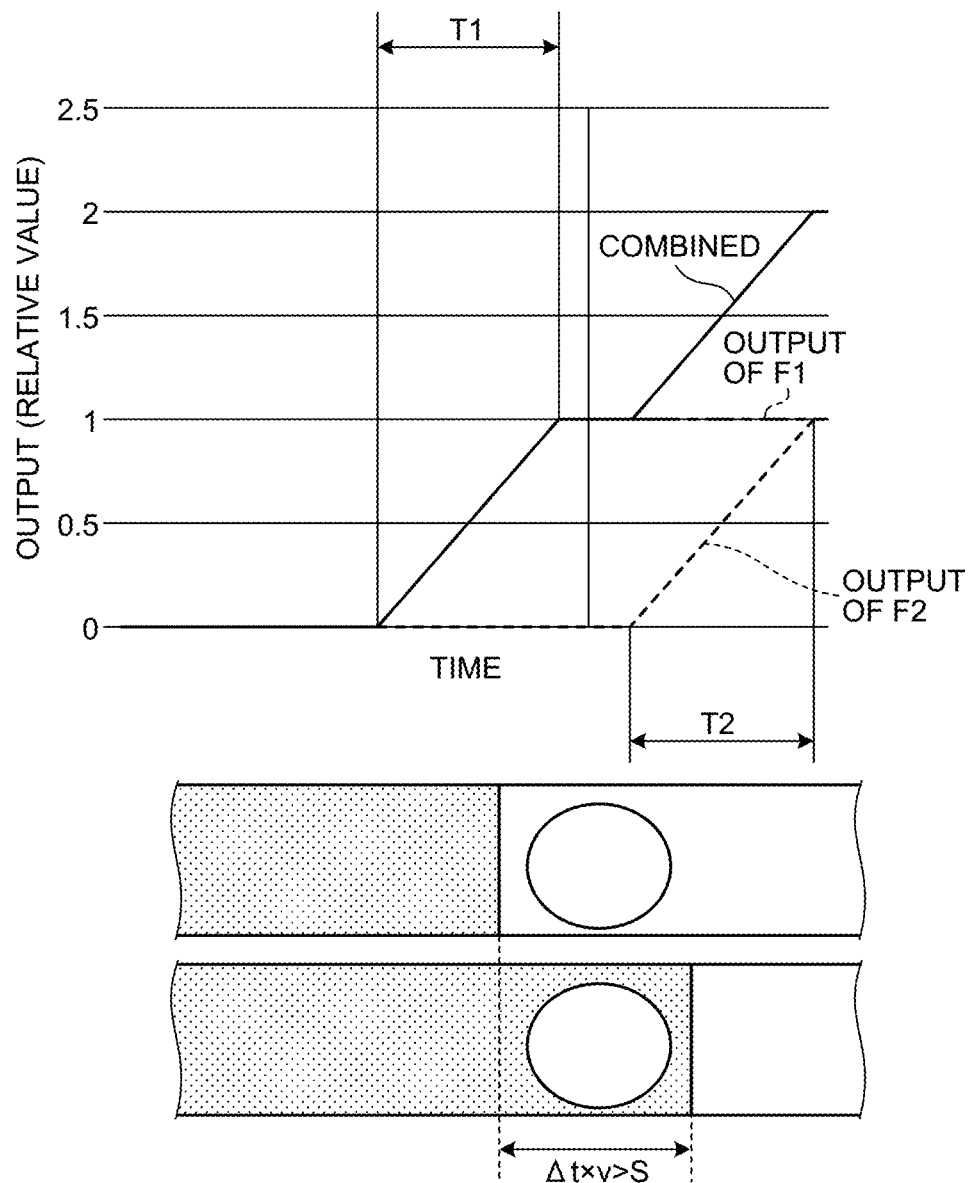

FIG.9
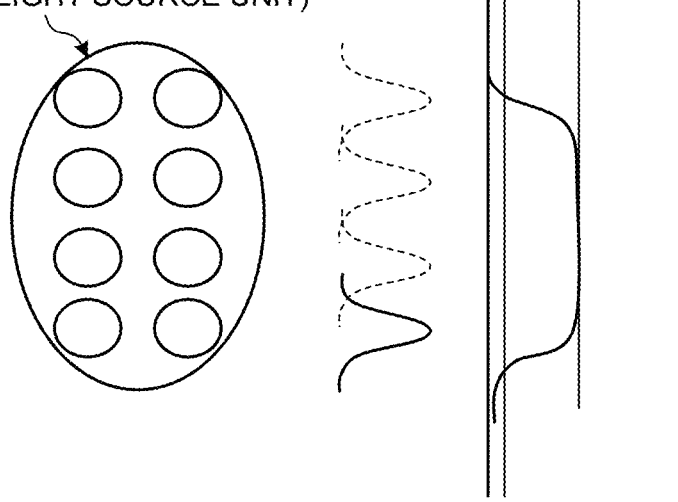
FIRST LIGHT SOURCE UNIT
(OR SECOND LIGHT SOURCE UNIT)
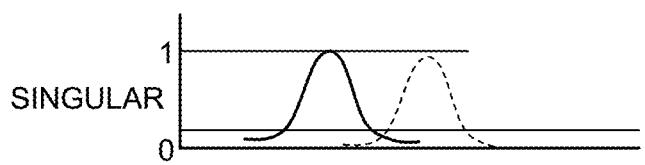
SINGULAR
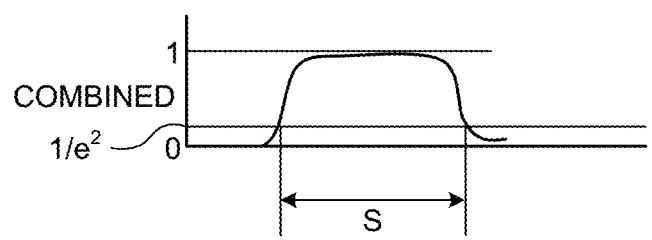
COMBINED
$1/e^2$
S WHEN IMAGES OF PLURALITY OF WAVELENGTH
CONVERSION REGIONS ARE SUPERIMPOSED ON
EACH OTHER TO FORM ONE IMAGE

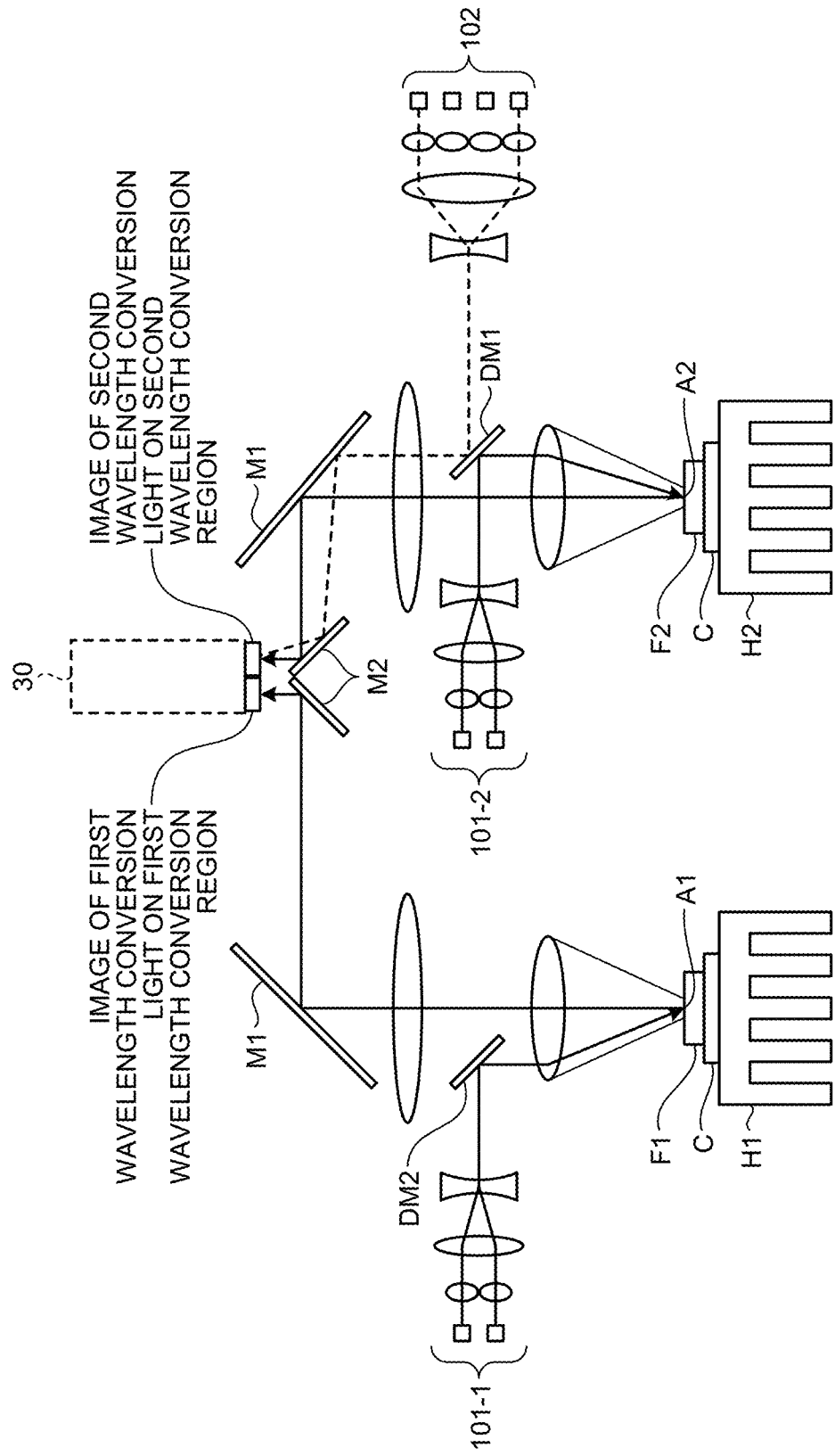

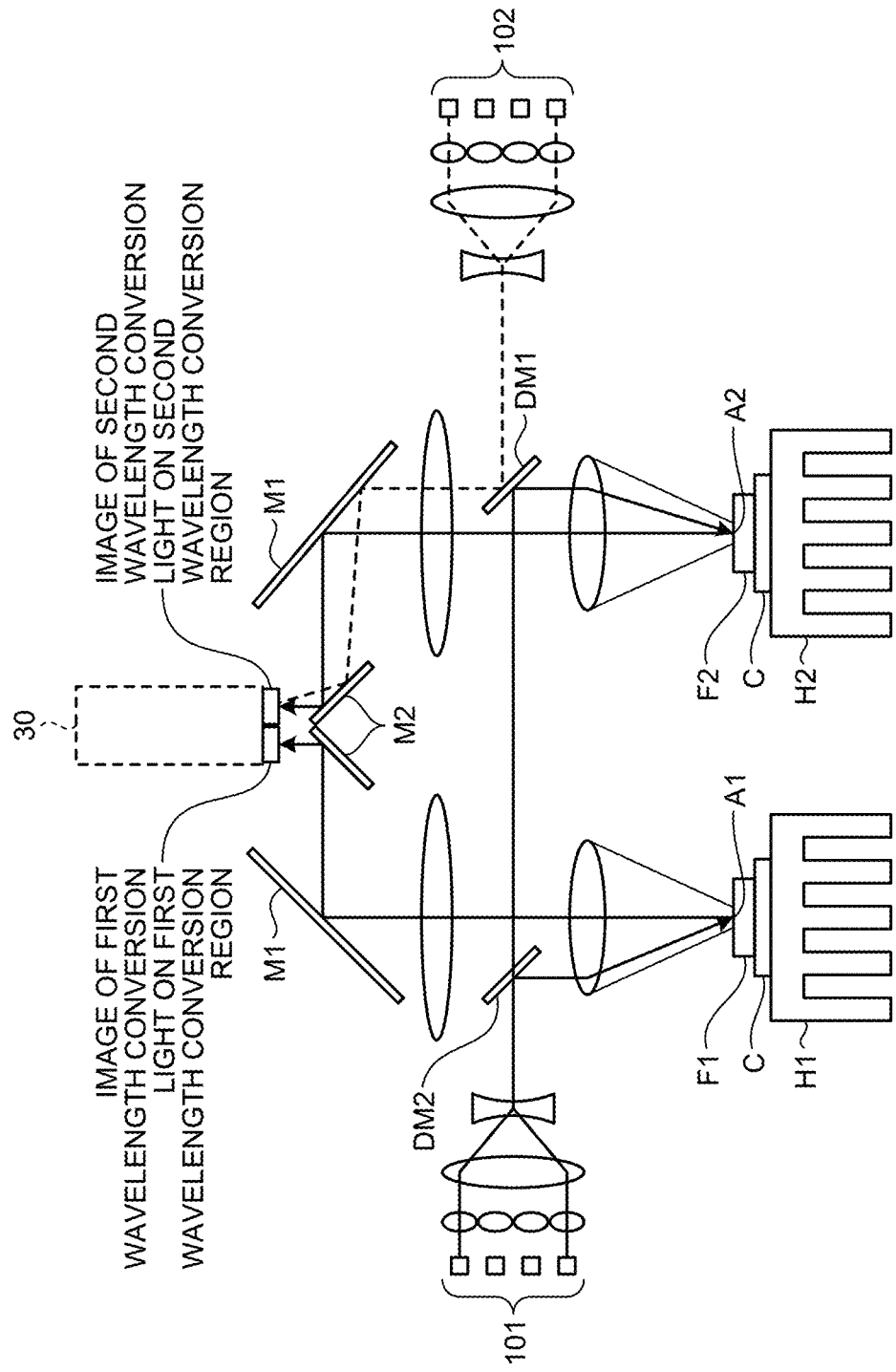

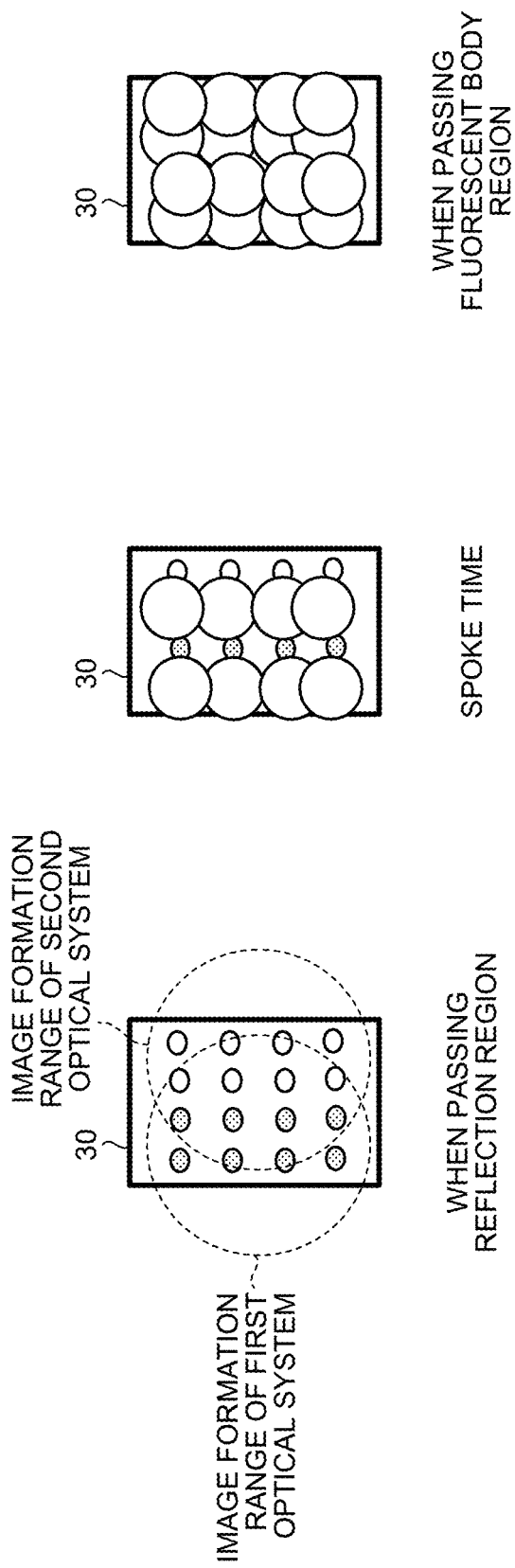

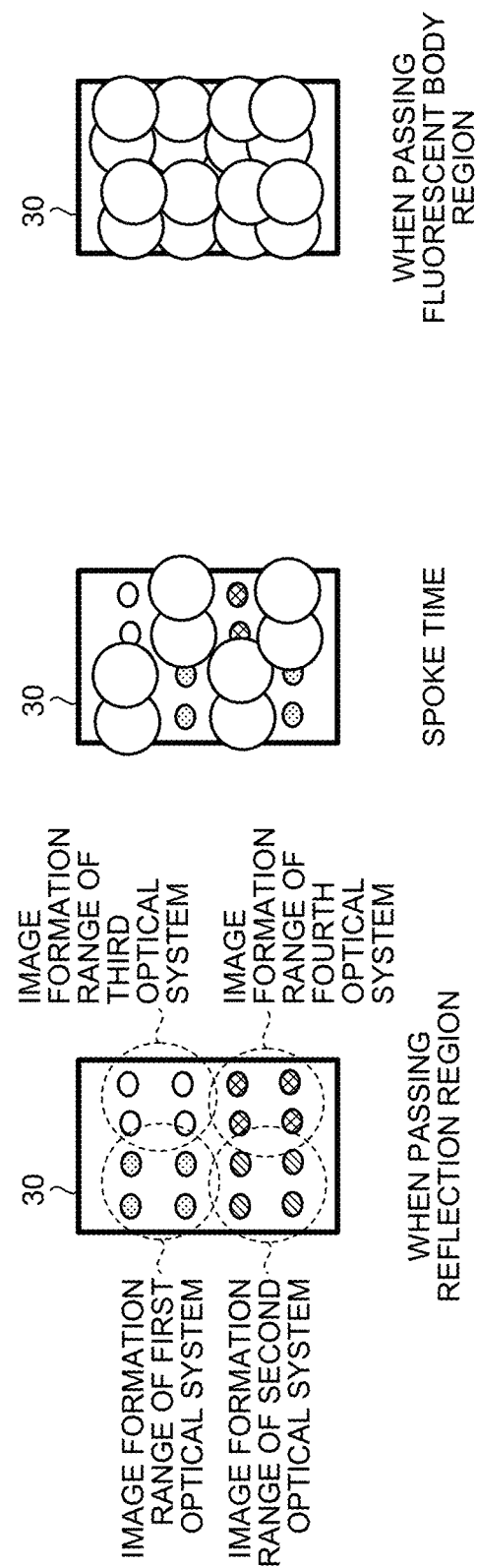

LIGHT SOURCE DEVICE AND PROJECTION DEVICE

CROSS-REFERENCE TO RELATED APPLICATIONS

The present application claims priority under 35 U.S.C. § 119 to Japanese Patent Application No. 2020-202828, filed on Dec. 7, 2020 and Japanese Patent Application No. 2021-165571, filed on Oct. 7, 2021. The contents of which are incorporated herein by reference in their entirety.

BACKGROUND OF THE INVENTION

1. Field of the Invention

The present invention relates to a light source device and a projection device.

2. Description of the Related Art

Projectors (image projection devices) configured to magnify and project various images have been widely used recently. A projector is a device that condenses light emitted from a light source to a spatial light modulation element (image display element) such as a digital mirror device (DMD) or a liquid crystal element and displays the emission light (reflection light) from the spatial light modulation element modulated based on a video signal on a screen as a color image.

The conventional projector, which has mainly employed a super high pressure mercury lamp or the like with high luminance, has short life and needs frequent maintenance. Moreover, the use of mercury, which is a harmful substance, needs to be suppressed in consideration of an environment aspect. Thus, the projector has come to use a solid-state light source such as a laser light source or a light-emitting diode (LED) light source. The laser light source or the LED light source has long life and high color reproducibility because of its monochromaticity. Therefore, the projector including the super high pressure mercury lamp will be used only for the special purposes in the future and most of the commercial projectors may be replaced by the projectors including the solid-state light sources.

Incidentally, projecting a color image requires illumination light sources with at least three primary colors. All these colors can be generated from laser light sources; however, this is not preferable because green laser and red laser have lower luminous efficiency than blue laser. Therefore, in a mainly employed method, a fluorescent body is irradiated with the blue laser as excitation light, and from the fluorescence with the wavelength converted in the fluorescent body, red light and green light are generated.

On the other hand, since the excitation light with several tens of watts is condensed and the fluorescent body is irradiated therewith, the efficiency decreases and change over time occurs due to burnout or temperature increase. In view of this, a technique has been developed in which a fluorescent body layer is formed on a circular plate and this circular plate is rotated, so that the irradiation position with the excitation light does not concentrate on one point. This technique is, however, not enough to perform the projection with a brighter light source device. As one of the methods to solve this problem, a technique of using more fluorescent wheels and combining the fluorescence emitted from these fluorescent wheels has been developed (for example, see Japanese Unexamined Patent Application Publication No. 2019-184628).

In the method using the fluorescent bodies, the wavelength colors of the fluorescence emitted from the fluorescent bodies (for example, yellow and green) and the original color of the light source (for example, blue light source or red light source) may be used. In this case, a DLP (registered trademark) single-chip method that can achieve the drastic size reduction of the light source device has a problem in that loss occurs when the colors are switched.

SUMMARY OF THE INVENTION

According to an aspect of the present invention, a light source device includes a light source, a plurality of wavelength conversion units, and a plurality of optical systems. The plurality of wavelength conversion units each includes a wavelength conversion region configured to receive light emitted from the light source and emit light with a wavelength different from a wavelength of the received light. The plurality of optical systems are configured to form images of wavelength conversion regions of the plurality of wavelength conversion units. The light source is configured to irradiate the wavelength conversion units with light at a same timing. The plurality of optical systems are configured to cause the images of the wavelength conversion regions of the plurality of wavelength conversion units to be adjacent to or superimposed on each other.

BRIEF DESCRIPTION OF THE DRAWINGS

FIG. 1A is a schematic structure diagram of a projection device according to a first embodiment;

FIG. 1B is a diagram illustrating one example of a structure of a light source device of the projection device according to the first embodiment;

FIGS. 5A to 5C are diagrams for describing one example of a basic characteristic part of the light source device according to the first embodiment;

FIG. 6 is a diagram for describing examples of the operation of synchronizing the light irradiation timings to the wavelength conversion elements in the light source device according to the first embodiment;

FIG. 7A is a diagram for describing one example of an output driving timing for excitation light from first and second light source units, an output timing for a rotation signal of the wavelength conversion element, and a light-emitting timing for the fluorescence emitted from the wavelength conversion element in the projection device according to the first embodiment;

FIG. 7B is a diagram for describing one example of the output timing for the rotation signal of the wavelength conversion element and the light-emitting timing for the fluorescence emitted from the wavelength conversion element in the projection device according to the first embodiment;

FIG. 7C is a diagram for describing one example of the output timing for the rotation signal of the wavelength conversion element and the light-emitting timing for the fluorescence emitted from the wavelength conversion element in the projection device according to the first embodiment;

FIG. 8A is a diagram for describing one example of a pattern in which a border of the wavelength conversion element passes an irradiation spot in the projection device according to the first embodiment;

FIG. 8C is a diagram for describing one example of the pattern in which the border of the wavelength conversion element passes the irradiation spot in the projection device according to the first embodiment;

FIG. 8D is a diagram for describing one example of the pattern in which the border of the wavelength conversion element passes the irradiation spot in the projection device according to the first embodiment;

FIG. 9 is a diagram for describing the spot size of the excitation light with which the wavelength conversion element in the projection device according to the first embodiment is irradiated;

FIG. 14 is a diagram illustrating one example of a structure of a light source device according to a fifth embodiment;

FIG. 16 is a diagram illustrating one example of a structure of a light source device according to a sixth embodiment;

FIG. 18 is a diagram for describing examples of a formation method for an image of the wavelength conversion region by the light source device according to one embodiment; and FIG. 19 is a diagram for describing examples of a formation method for an image of the wavelength conversion region by the light source device according to one embodiment.

The accompanying drawings are intended to depict exemplary embodiments of the present invention and should not be interpreted to limit the scope thereof. Identical or similar reference numerals designate identical or similar components throughout the various drawings.

DESCRIPTION OF THE EMBODIMENTS

Figure 2:
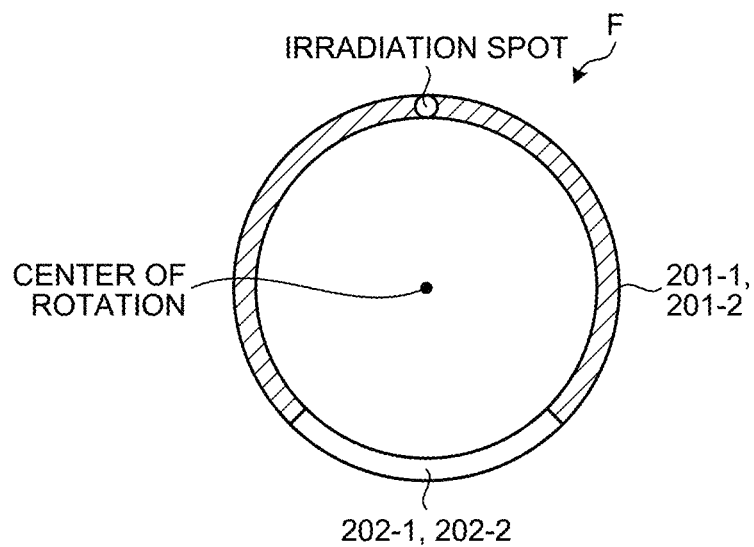
FIG. 2 is a diagram illustrating one example of a structure of a wavelength conversion element in the light source device according to the first embodiment.

The terminology used herein is for the purpose of describing particular embodiments only and is not intended to be limiting of the present invention.

As used herein, the singular forms "a", "an" and "the" are intended to include the plural forms as well, unless the context clearly indicates otherwise.

In describing preferred embodiments illustrated in the drawings, specific terminology may be employed for the sake of clarity. However, the disclosure of this patent specification is not intended to be limited to the specific terminology so selected, and it is to be understood that each specific element includes all technical equivalents that have the same function, operate in a similar manner, and achieve a similar result.

An embodiment of the present invention will be described in detail below with reference to the drawings.

An embodiment has an object to provide a light source device and a projection device capable of emitting brighter light with higher light use efficiency of a light source.

Embodiments of a light source device and a projection device are hereinafter described in detail with reference to the attached drawings.

First Embodiment

FIG. 1A is a schematic structure diagram of a projection device according to a first embodiment. A projection device 1 according to the present embodiment is a projector, for example, and includes a housing 10, a light source device 20, a light homogenizing element 30, an illumination optical system 40, an image formation element (image display element) 50, and a projection optical system 60.

The housing 10 houses the light source device 20, the light homogenizing element 30, the illumination optical system 40, the image formation element 50, and the projection optical system 60.

The light source device 20 emits light having wavelengths corresponding to the respective colors of RGB. An internal structure of the light source device 20 is described below in detail.

The light homogenizing element 30 homogenizes the light emitted from the light source device 20 by mixing. Examples of the light homogenizing element 30 include a light tunnel combining four mirrors, a rod integrator, and a fly-eye lens.

The illumination optical system 40 illuminates substantially uniformly the image formation element 50 with the light homogenized by the light homogenizing element 30.

The illumination optical system 40 includes one or more lenses or one or more reflection surfaces, for example.

The image formation element 50 includes, for example, a light valve such as a digital micromirror device (DMD), a transmission type liquid crystal panel, or a reflection type liquid crystal panel. The image formation element 50 forms an image by modulating the light emitted from the illumination optical system 40 (the light from a light source optical system of the light source device 20). That is to say, the image formation element 50 functions as one example of a spatial modulator that forms an image by turning on and off the light for each of the pixels of the image formed by the light source device 20.

The projection optical system 60 magnifies the image formed by the image formation element 50 and projects the image to a screen (projection surface) 70. The projection optical system 60 includes one or more lenses, for example.

FIG. 1B is a diagram illustrating one example of a structure of the light source device of the projection device according to the first embodiment. The light source device 20 according to the present embodiment includes wavelength conversion light source units A and B. Although the structure of the wavelength conversion light source unit A is described below, the wavelength conversion light source unit B also has the similar structure.

The wavelength conversion light source unit A includes a first light source unit formed of 2*4 semiconductor lasers LD1 and LD2. The light (light rays, light source light) emitted from the first light source unit (one example of light source) is condensed to a collimator lens CL and guided to a dichroic mirror DM through an optical system of condensing elements L1 and L2. The light source light guided to the dichroic mirror DM is reflected by the dichroic mirror DM and a first wavelength conversion region A1 of a wavelength conversion element (for example, fluorescent body, one example of wavelength conversion unit) F1 formed on a substrate C is irradiated therewith.

An image on the wavelength conversion region (first wavelength conversion region A1) of the wavelength conversion element F1 obtained by the reach of the light source light is formed at a conjugated position in an image formation relation through optical elements L3 and L4 and mirrors M1 and M2, for example. The conjugated position is a position where the image of the wavelength conversion light (image of first wavelength conversion light) existing at the first wavelength conversion region A1 illustrated in FIG. 1B is formed. Here, the wavelength conversion light is the light whose wavelength is converted by the wavelength conversion element F1.

On the other hand, a second wavelength conversion region A2 of another wavelength conversion element (fluorescent body) F2, which is different from the first wavelength conversion region A1 of the wavelength conversion element F1, is irradiated with the light source light from a second light source unit (one example of light source) and an image of the wavelength conversion light (image of second wavelength conversion light) in the conjugated positional relation with the second wavelength conversion region A2 is formed adjacent to (or superimposed on) the image of the first wavelength conversion light through the optical elements L3 and L4 and the mirrors M1 and M2, for example. In the present embodiment, the first wavelength conversion region A1 and the second wavelength conversion region A2 function as one example of the wavelength conversion region that receives the light emitted from the first and the second light source units and emits the light with the wavelength different from the wavelength of the received light. The collimator lens CL, the condensing elements L1 and L2, the optical elements L3 and L4, the dichroic mirror DM, and the mirrors M1 and M2 function as a first optical system 501 (see FIGS. 5A to 5C) and a second optical system 502 (see FIGS. 5A to 5C) that form the images of the first wavelength conversion region A1 and the second wavelength conversion region A2.

One image combining the image of the first wavelength conversion light and the image of the second wavelength conversion light exists at an incidence opening part of the light homogenizing element 30 illustrated with a dashed line; therefore, after this, the image is reflected inside the light homogenizing element 30 and homogenized. The light source device 20 according to the present embodiment is characterized in that the first light source unit and the second light source unit emit the light source light to the first wavelength conversion region A1 and the second wavelength conversion region A2 of the wavelength conversion elements (fluorescent bodies) F1 and F2 at the same timing or at substantially the same timing. The first optical system 501 (see FIGS. 5A to 5C) and the second optical system 502 (see FIGS. 5A to 5C) cause the image of the first wavelength conversion region A1 and the image of the wavelength conversion region A2 to be adjacent to or superimposed on each other, thereby forming one image. Thus, the light quantity of the light emitted from the light source device 20 can be increased and the thermal burden on the wavelength conversion elements F1 and F2 can be reduced; therefore, the light use efficiency of the first and the second light source units can be increased and the brighter light can be emitted.

Each of the first and the second light source units may be any light source that emits excitation light for the wavelength conversion elements F1 and F2 including blue and ultraviolet-ray regions. Specifically, the first and the second light source units function as one example of a plurality of excitation light sources that irradiates the first wavelength conversion region A1 and the second wavelength conversion region A2 with light at the same timing. In the present embodiment, each of the first and the second light source units may include one LD or may be an LD array in which a plurality of LD columns are arranged so that the entire shape becomes rectangular. In the present embodiment, each of the first and the second light source units is an LD array including 2*4 LDs, which means eight LDs in total, but may be a multi-chip type. Although the first and the second light source units are the same light source unit in the present embodiment, two light source units may be employed; for example, a half of 4*4 LDs may be branched by a mirror or separated by a half mirror.

Although the first wavelength conversion region A1 and the second wavelength conversion region A2 of the wavelength conversion elements F1 and F2 are formed by wavelength conversion units formed on different substrates C in the present embodiment, the embodiment is not limited to this structure and the first wavelength conversion region A1 and the second wavelength conversion region A2 may be formed on the same substrate C. As a preferred structure of the substrate C, a substrate with a disc-like shape having higher thermal conductivity than the fluorescent body is preferable; for example, it is preferable to apply the fluorescent body on the substrate made of ceramic, metal, or the like, or fix the fluorescent body to the substrate with an adhesive member. Alternatively, the substrate C may have a fluorescent wheel shape; for example, the substrate C has a disc-like shape and is rotated using the center as a central axis, the fluorescent body (wavelength conversion elements F1 and F2) is formed along the circumference, and the fluorescent body (wavelength conversion elements F1 and F2) is moved by rotation.

FIG. 2 is a diagram illustrating one example of the structure of the wavelength conversion element in the light source device according to the first embodiment. As illustrated in FIG. 2, the wavelength conversion element F1 according to the present embodiment is a fluorescent wheel including at least two segments of a fluorescent body region 201-1 (first wavelength conversion region A1) corresponding to a region of a wavelength conversion member (fluorescent body) and a reflection region 202-1 that reflects the light emitted from the first light source unit (in other words, non-conversion region emitting the light received from the first light source unit without converting the wavelength of the light). Similarly, the wavelength conversion element F2 is a fluorescent wheel including at least two segments of a fluorescent body region 201-2 (second wavelength conversion region A2) corresponding to the region of the wavelength conversion member (fluorescent body) and a reflection region 202-2 that reflects light emitted from the second light source unit (in other words, non-conversion region emitting the light received from the second light source unit without converting the wavelength of the light). In the description below, the fluorescent body regions 201-1 and 201-2 are referred to as the fluorescent body region 201 unless they need to be distinguished, and the reflection regions 202-1 and 202-2 are referred to as the reflection region 202 unless they need to be distinguished.

At an irradiation spot in the wavelength conversion element F1 irradiated with the light from the first light source unit, the fluorescent body region 201-1 and the reflection region 202-1 are switched alternately and the light with different wavelengths is emitted in a time-division manner. Moreover, at an irradiation spot in the wavelength conversion element F2 irradiated with the light from the second light source unit, the fluorescent body region 201-2 and the reflection region 202-2 are switched alternately and the light with different wavelengths is emitted in a time-division manner.

In this case, the first and the second light source units preferably emit blue light source light. In the light source device 20 according to the present embodiment, a light absorption or light reflection member is disposed on each wheel of the wavelength conversion elements F1 or F2 or on a member that rotates while supporting the wheel, and inspection is performed using a photocoupler, for example, so that the rotation speed of the two wheels are made the same.

In the light source device 20 according to the present embodiment, the first and the second light source units irradiates the borders between the fluorescent body regions 201-1 and 201-2 and the reflection regions 202-1 and 202-2 with the light at substantially the same timing. Thus, the spoke time can be shortened and the light source device 20 with brightness and high light use efficiency can be achieved. Alternatively, the light source device 20 according to the present embodiment makes the first light source unit and the second light source unit emit light source light at the same timing so that while at least the border between the fluorescent body region 201-1 and the reflection region 202-1 crosses the irradiation spot, the border between the fluorescent body region 201-2 and the reflection region 202-2 crosses another irradiation spot.

As described above, the wavelength conversion light source units A and B include the structure including the first and the second light source units, the first optical system 501 and the second optical system 502 (see FIGS. 5A to 5C) guiding the light source light emitted from the first and the second light source units to the wavelength conversion elements F1 and F2, the wavelength conversion elements F1 and F2, and the elements that form the images of the wavelength conversion regions of the wavelength conversion elements F1 and F2. The light source device 20 according to the present embodiment includes the two mirrors M2 set at approximately 90° for combining the conjugated images formed by two sets of wavelength conversion light source units A and B as illustrated in FIG. 1B, and by the two mirrors M2, the two conjugated images are put adjacent to each other and one image is formed.

Figure 3:
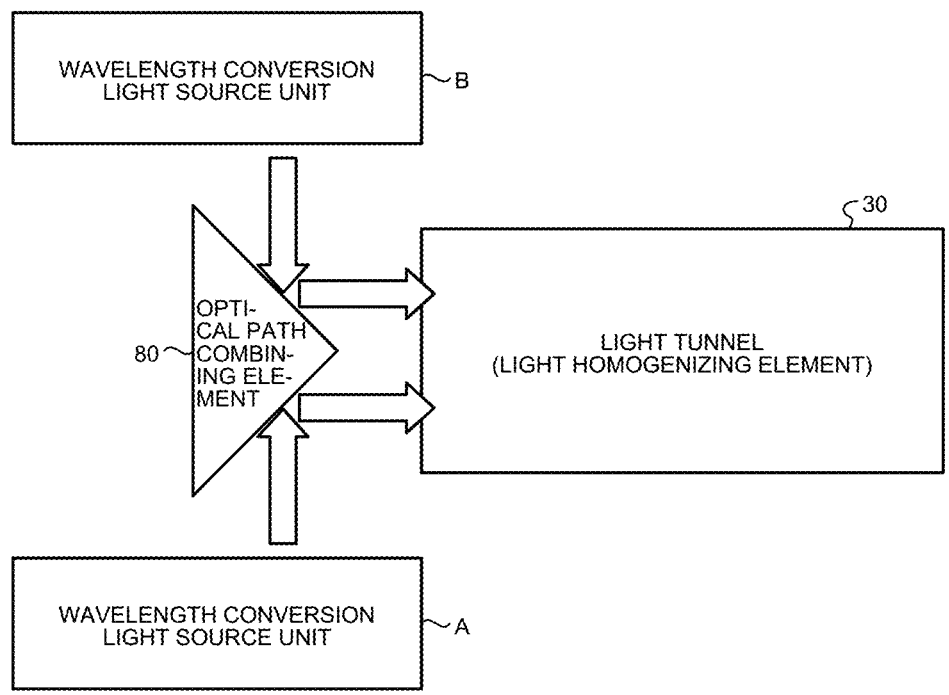
FIG. 3 is a schematic diagram illustrating one example of the structure of the light source device according to the first embodiment.

FIG. 3 is a schematic diagram illustrating one example of the structure of the light source device according to the first embodiment. The light source device 20 according to the present embodiment includes the wavelength conversion light source units A and B, an optical path combining element 80, and the light homogenizing element 30 as illustrated in FIG. 3. The wavelength conversion light source units A and B are structured based on a basic design concept (some directions including reflection directions may be different) and emit light bundles with a predetermined shape.

The light bundles emitted from the wavelength conversion light source units A and B are deflected by the optical path combining element 80 and enter the incidence surface of the light homogenizing element 30. The light bundle having entered the light homogenizing element 30 through the incidence surface propagates in the light homogenizing element 30 while repeating reflection, and exits from an emission surface. In the light source device 20 according to the present embodiment, the light bundles emitted from the wavelength conversion light source units A and B are reflected a plurality of times inside the light homogenizing element 30, so that the uniform planar light source can be formed on the emission surface. Note that a light tunnel that is hollow inside and has an inner surface formed by a mirror, a rod whose prismatic column is formed of a transparent material such as glass, or the like can be used as the light homogenizing element 30.

Figure 4:
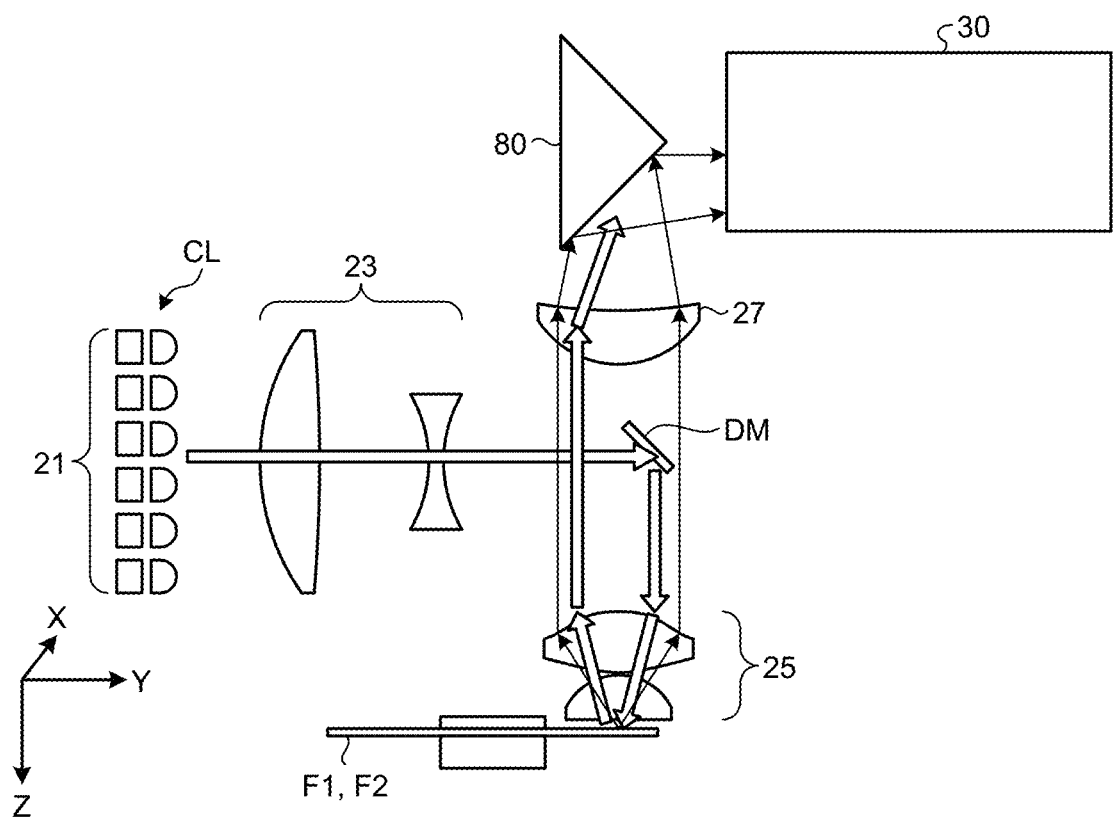
FIG. 4 is a schematic diagram illustrating one example of a structure of a wavelength conversion light source unit in the light source device according to the first embodiment.

FIG. 4 is a schematic diagram illustrating one example of the structure of the wavelength conversion light source unit in the light source device according to the first embodiment. The wavelength conversion light source units A and B each include light sources 21 (including LD1, LD2) that are solid-state light sources, the collimator lenses CL provided in accordance with the respective light sources 21, a first lens group 23 (condensing elements L1, L2), the dichroic mirror DM, a second lens group 25 (optical element L3), the wavelength conversion element (fluorescent wheel) F1 or F2, a third lens group 27 (optical element L4), the optical path combining element 80, a color wheel (not illustrated), and the like. The wavelength conversion light sources A and B each have a structure in which these components are arranged in this order in a direction where the excitation light emitted from the light source 21 propagates.

The light source 21 emits the light in a blue band whose central wavelength of emission intensity is 455 nm as the excitation light that excites the fluorescent body in the wavelength conversion element F1 or F2. The blue light emitted from the light source 21 is linearly polarized light whose polarization state is constant, and is set to become S-polarized light with respect to a polarizing beam splitter (dichroic mirror DM). The wavelength band is not limited to the blue band and may be any band that can excite the wavelength conversion element F1 or F2. A plurality of laser light sources are used as the light sources 21 in the drawing;

however, one laser light source may be used. When the light sources 21 are the laser light sources, the light sources 21 may be, but not limited to, light source units arranged in the array shape on the substrate.

The excitation light emitted from the light sources 21 become approximately parallel light by the collimator lenses CL corresponding to the respective light sources 21. The excitation light that has become the approximately parallel light passes the first lens group 23 and is guided to the dichroic mirror DM. The dichroic mirror DM is a parallel flat-plate shaped glass plate and has its incidence surface side coated so that the wavelength band of the excitation light is reflected and the fluorescence generated from the wavelength conversion elements F1 and F2 passes; thus, the function of the dichroic mirror DM is achieved. A light guide member may be made of transparent resin. A center of the dichroic mirror DM is shifted from the optical axis of the second lens group 25, and the excitation light emitted from the light source 21 is incident while tilted from the normal direction of the fluorescent wheel (wavelength conversion element F1 or F2).

The excitation light reflected by the dichroic mirror DM is guided to the wavelength conversion element F1 or F2 by the second lens group 25. The excitation light reflected on the reflection region 202-1 or 202-2 of the wavelength conversion element F1 or F2 passes the second lens group 25 again, passes the opposite side of the dichroic mirror DM with respect to the optical axis of the second lens group 25, passes the third lens group 27, is deflected by the optical path combining element 80, and enters the light homogenizing element 30.

The fluorescence emitted by the incidence of the excitation light to the fluorescent body region 201-1 or 201-2 of the wavelength conversion element F1 or F2 becomes the approximately parallel light through the second lens group 25, passes the light guide member, is refracted by the third lens group 27 so as to be condensed near the light homogenizing element 30, is deflected by the optical path combining element 80, and enters the light homogenizing element 30 (light tunnel).

Next, with reference to FIGS. 5A to 5C, one example of the basic characteristic part of the light source device 20 according to the present embodiment is described. FIGS. 5A to 5C are diagrams for describing one example of the basic characteristic part of the light source device according to the first embodiment. FIG. 5A is a structure conceptual diagram of the light source device 20 according to the present embodiment in a different viewpoint. FIG. 5B is a diagram illustrating the state in which the image of the excitation light source is formed near the entrance of the light homogenizing element 30. FIG. 5C is a diagram illustrating the state in which the fluorescence is formed near the entrance of the light homogenizing element 30.

In the light source device 20 according to the present embodiment, the image of the first wavelength conversion region A1 on the wavelength conversion element F1 is formed near the opening position of the light homogenizing element 30 by the first optical system 501. The first optical system 501, if having an approximately circular opening, has an image circle with a circular shape similar to the opening of the lens. The image circle of the first optical system 501 is formed near the opening position of the light homogenizing element 30. The image of the second wavelength conversion region A2 formed by the second optical system 502 is formed as the image of the fluorescent body region 201-2 on the wavelength conversion element F2 while being superimposed on the image of the first wavelength conversion region A1 (the image of fluorescent body region 201-1 on the wavelength conversion element F1).

Here, in a case where the blue light emitted from the light source 21 as the excitation light is reflected on the reflection regions 202-1 and 202-2 on the wavelength conversion elements F1 and F2, as illustrated in FIG. 5B, the excitation light source images with a dotted pattern in accordance with the number of light sources 21 of the excitation light are formed in the image formation ranges corresponding to the image circles of the first optical system 501 and the second optical system 502. In the drawing, the 2*4 LD array including eight LDs are provided as the light sources 21; however, the number of LDs and the arrangement are not limited to this example.

Specifically, the image of the wavelength conversion light source unit A condensed on the wavelength conversion element F1 is formed again and at the conjugated position at the entrance of the light homogenizing element 30, the image is formed as eight dots in the image circle as illustrated in FIG. 5B. On the other hand, the image of the wavelength conversion light source unit B is also reflected on the fluorescent wheel (wavelength conversion element F2) and formed in the image circle of the wavelength conversion light source unit B while overlapping with a part of the image circle of the wavelength conversion light source unit A. As already described above, the shape, the arrangement, and the number of columns of the LD1 and LD2 are not limited to this example.

At the conjugated position of the light homogenizing element 30, the fluorescence is generated around the spot light of the excitation light, and as illustrated in FIG. 5C, by the generated fluorescence, the image of the fluorescence is formed inside the image circle of each of the wavelength conversion light source units A and B in the arrangement similar to the image of the excitation light. Regarding the image of this fluorescence, the spot light of the excitation light spreads a little over the spot size due to the internal scattering in the wavelength conversion elements F1 and F2, so that the fluorescence spot larger than the excitation spot size is formed. Therefore, as illustrated in FIG. 5C, the spots are formed continuously as if they were connected at the conjugated position. The optical systems are designed so that two groups of 2*4 fluorescence images are formed adjacent to each other and substantially fall within the opening at the entrance of the light homogenizing element 30.

Next, one example of the operation of synchronizing the light irradiation timings to the wavelength conversion elements F1 and F2 in the light source device 20 in the present embodiment and one example of the effect thereof are described with reference to FIG. 6. FIG. 6 is a diagram for describing examples of the operation of synchronizing the light irradiation timings to the wavelength conversion elements in the light source device according to the first embodiment. FIG. 6 illustrates, at (a), the behavior of the image of the wavelength conversion light within the time for which the border between the fluorescent body region 201-1 and the reflection region 202-1 crosses the irradiation spot in the light irradiation method for the irradiation spot of the wavelength conversion region in the conventional light source device, that is, the light source device including only one fluorescent wheel. The light source unit condenses the irradiation light from the 4*4 LD unit to emit the spot light in order to obtain the necessary irradiation power.

On the other hand, FIG. 6 illustrates, at (b), the behavior of the image of the first and the second wavelength conversion light within the time for which the border between the fluorescent body region 201-1 and the reflection region 202-1 and the border between the fluorescent body region 201-2 and the reflection region 202-2 cross the irradiation spot in the case where the light emitted from the light source 21 is divided into two and the different fluorescent wheels (wavelength conversion elements F1 and F2) are irradiated with the divided light at the same time in the light source device 20 according to the present embodiment. As illustrated in FIG. 5B, the irradiation spots in the upper two columns on the light homogenizing element 30 are the image of the first wavelength conversion region A1, and the irradiation spots in the lower two columns on the light homogenizing element 30 are the image of the second wavelength conversion region A2.

In the light source device 20 according to the present embodiment, the fluorescence wheels (wavelength conversion elements F1 and F2) are rotated and moved; therefore, there is a limited time after the border between the reflection region 202-1 and the fluorescent body region 201-1 and the border between the reflection region 202-1 and the fluorescent body region 201-2 enter the irradiation spot and before these borders exit from the irradiation spot completely. This time is so-called spoke time, and there is a time when the wavelength is switched from the blue wavelength to the converted wavelength; therefore, this time corresponds to the period where the color mixing occurs. As the spoke time is shorter, the light use efficiency increases and the color purity also increases.

As is clear from the comparison between (a) and (b) in FIG. 6, when the light emitted from the light source 21 is divided and the separate first and second wavelength conversion regions A1 and A2 are irradiated with the divided light at the same time, the spoke time is reduced to a half. Thus, the time of switching the light from the blue wavelength to the wavelength converted light can be shortened and accordingly, the loss in the spoke time or the color mixing can be prevented. Therefore, the light source device 20 and the projection device 1 with high light use efficiency can be achieved.

Thus, the projection device 1 according to the first embodiment can increase the light quantity of the light emitted from the light source device 20 and reduce the thermal burden on the wavelength conversion elements F1 and F2; therefore, the light use efficiency of the first and the second light source units can be increased and the brighter light can be emitted.

FIG. 7A is a diagram for describing one example of an output driving timing for the excitation light from the first and the second light source units, an output timing for a rotation signal of the wavelength conversion element, and a light-emitting timing for the fluorescence emitted from the wavelength conversion element in the projection device according to the first embodiment. FIG. 7B and FIG. 7C are diagrams each for describing one example of the output timing for the rotation signal of the fluorescent wheel (wavelength conversion element) and the light-emitting timing for the fluorescence emitted from the fluorescent wheel (wavelength conversion element) in the projection device according to the first embodiment. Regarding the fluorescent wheel (wavelength conversion element F1 or F2) illustrated in FIG. 2, the fluorescent body region 201 and the reflection region 202 are disposed on the circumference of the fluorescent wheel. The irradiation spot of the excitation light with which the fluorescent wheel F1 or F2 is irradiated is switched alternately between on the wavelength conversion region 201 and the reflection region 202 by rotation of the fluorescent wheel F1 or F2.

One frame period in FIG. 7A corresponds to the period for which the fluorescent wheel F1 or F2 rotates once. One frame period is divided into a period for which the fluorescent body region 201 is irradiate with the irradiation spot and a period for which the reflection region is irradiated with the irradiation spot. As illustrated in FIG. 7A, the fluorescent wheel F1 or F2 outputs the fluorescence (in the drawing, "1") in the period for which the fluorescent body region 201 is irradiated with the irradiation spot and the fluorescent wheel F1 or F2 outputs the blue light (in the drawing, "1") in the period for which the reflection region 202 is irradiated with the irradiation spot.

Here, the light output from the first light source unit and the second light source unit is the constant output. Therefore, the timing when the fluorescent wheel F1 or F2 outputs the fluorescence and the timing when the fluorescent wheel F1 or F2 outputs blue light depend on the timing when the fluorescent body region 201 is irradiated with the irradiation spot and the timing when the reflection region 202 is irradiated with the irradiation spot.

The fluorescent wheels F1 and F2 each include a rotation detection sensor, and by monitoring the rotation speed of the fluorescent wheels F1 and F2, the rotation of the fluorescent wheels is controlled. In the example illustrated in FIG. 7A, the rotation detection sensor outputs the rotation signal (rotation signal F1/1, F1/2, F1/3) at the timing when the irradiation spot passes the border between the reflection region 202-1 and the fluorescent body region 201-1 on the fluorescent wheel F1. Similarly, the rotation detection sensor outputs the rotation signal (rotation signal F2/1, F2/2, F2/3) at the timing when the irradiation spot passes the border between the reflection region 202-2 and the fluorescent body region 201-2 on the fluorescent wheel F2. In the light source device 20 according to the present embodiment, the rotation of the fluorescent wheels F1 and F2 is controlled based on the rotation signals of the fluorescent wheels F1 and F2.

FIG. 7B illustrates the example in which the rotation of the fluorescent wheels F1 and F2 is controlled so that the timings of the rotation signal of the fluorescent wheel F1 and the rotation signal of the fluorescent wheel F2 coincide. The rotation is controlled so that the rotation signals F1/1, F1/2, F1/3 of the fluorescent wheel F1 (wavelength conversion element F1) and the rotation signals F2/1, F2/2, F2/3 of the fluorescent wheel F2 (wavelength conversion element F2) are respectively output at the same timing. Therefore, the light output from the fluorescent wheels F1 and F2 is switched from the blue light to the fluorescence at the same timing. Thus, the output of the light combined in the optical path combining element 80 can be switched from the blue light to the fluorescence in a short time. Accordingly, the color mixing period (spoke time) corresponding to the period for which the fluorescence and the blue light output from the light source device 20 mix can be shortened because the rotation of the fluorescent wheels F1 and F2 is controlled based on the rotation signals.

FIG. 7C is a diagram for describing the timing when the light source device 20 outputs the blue light and the fluorescence in the case where the rotation signal of the fluorescent wheel F1 and the rotation signal of the fluorescent wheel F2 are deviated in timing. In the drawing, the rotation signals F2/1, F2/2, and F2/3 are delayed with respect to the rotation signals F1/1, F1/2, and F1/3. Therefore, the timing when the border between the reflection region 202-1 and the fluorescent body region 201-1 of the fluorescent wheel F1 is irradiated with the excitation light in the irradiation spot is earlier than the timing when the border between the reflection region 202-2 and the fluorescent body region 201-2 of the fluorescent wheel F2 is irradiated with the excitation light in the irradiation spot.

Therefore, the timing when the fluorescent wheel F1 outputs the blue light and the fluorescence is earlier than the timing when the fluorescent wheel F2 outputs the blue light and the fluorescence. As a result, the period for which the light combined in the optical path combining element 80 and output from the light source device 20 is switched from the blue light to the fluorescence (spoke time) is extended and the period for which the blue light and the fluorescence mix (color mixing period) becomes longer. In the case where the color mixing period becomes longer in this manner, a countermeasure is necessary; for example, the output of the light source device 20 is turned off in the color mixing period and in this case, the light use efficiency deteriorates. In the light source device 20 according to the present embodiment, the rotation of the fluorescent wheels F1 and F2 is controlled based on the rotation signals of the fluorescent wheels F1 and F2 as illustrated in FIG. 7B; therefore, the color mixing period can be shortened and the light use efficiency can be increased.

The period for which the colors of the light output from the light source device 20 mix also depends on the size of the irradiation spot of the excitation light with which the fluorescent wheels F1 and F2 are irradiated. Each of FIG. 8A to FIG. 8D is a diagram for describing one example of the relation among the size of the irradiation spot with which the fluorescent wheel (wavelength conversion element) is irradiated, the timing when the irradiation spot passes the border between the reflection region and the fluorescence region, and the fluorescence output from the light source device in the light source device according to the first embodiment. In FIG. 8A to FIG. 8D, the vertical axis represents the output of light (relative value) from the fluorescent wheels (wavelength conversion elements F1 and F2), and the horizontal axis represents the time. The diameter corresponding to the size of the irradiation spot of the excitation light with which the fluorescent wheels F1 and F2 are irradiated is S and the relative moving speed between the fluorescent wheels F1 and F2 and the irradiation spot on the fluorescent wheels F1 and F2 is v. FIG. 9 is a diagram for describing the diameter S of the spot of the excitation light with which the fluorescent wheel is irradiated in the light source device according to the first embodiment. FIG. 9 schematically illustrates the irradiation spot in the case where the first light source unit (or the second light source unit) includes 2*4 semiconductor lasers.

The intensity distribution of each of the semiconductor lasers in the first light source unit (or second light source unit) is the Gaussian distribution as illustrated in FIG. 9. Therefore, the intensity distribution of the irradiation spot corresponds to the intensity distribution combining the respective Gaussian distributions. Here, the diameter of the irradiation spot is the diameter at which the intensity becomes $1/e^2$ of the peak value of the combined intensity distribution. Although the present embodiment describes the circular irradiation spot, the irradiation spot may be elliptical or rectangular, for example. In this case, the size of the irradiation spot in the relative moving direction (direction of relative speed v) between the fluorescent wheels F1 and F2 and the irradiation spot is employed.

A period T1 necessary for the irradiation spot to pass the border between the reflection region 202-1 and the fluorescent body region 201-1 of the fluorescent wheel F1 is expressed as T1=S/v. Similarly, a period T2 necessary for the irradiation spot to pass the border between the reflection region 202-2 and the fluorescent body region 201-2 of the fluorescent wheel F1 is expressed as T2=S/v. Since the periods T1 and T2 correspond to the color mixing periods (spoke time) of the respective fluorescent wheels F1 and F2, reducing the diameter S of the irradiation spot is effective in order to shorten the color mixing period. As described with reference to FIG. 6, the light source device 20 according to the present embodiment includes two fluorescent wheels (wavelength conversion elements F1 and F2) so that the spot size can be made about a half; therefore, the color mixing period can be made a half.

In the case where the rotation signals of the fluorescent wheel (wavelength conversion element) F1 and the fluorescent wheel (wavelength conversion element) F2 are deviated by Δt, the relative displacement between the border between the reflection region 202-1 and the fluorescent body region 201-1 of the fluorescent wheel F1 and the border between the reflection region 202-2 and the fluorescent body region 201-2 of the fluorescent wheel F2 is expressed as Δt*v. Here, Δt is the absolute value of the deviation of the rotation signal and is zero or a positive value. FIG. 8A illustrates the state in which Δt is zero, and in this case, the relative displacement between the border of the fluorescent wheel F1 and the border of the fluorescent wheel F2 is the minimum (Δt*v=0). The output of the fluorescence combined in this state increases in the period T1. This period T1 corresponds to the spoke time that is the color mixing period. The color mixing period in FIG. 8A is T1=T2 and is the minimum.

Figure 8B:
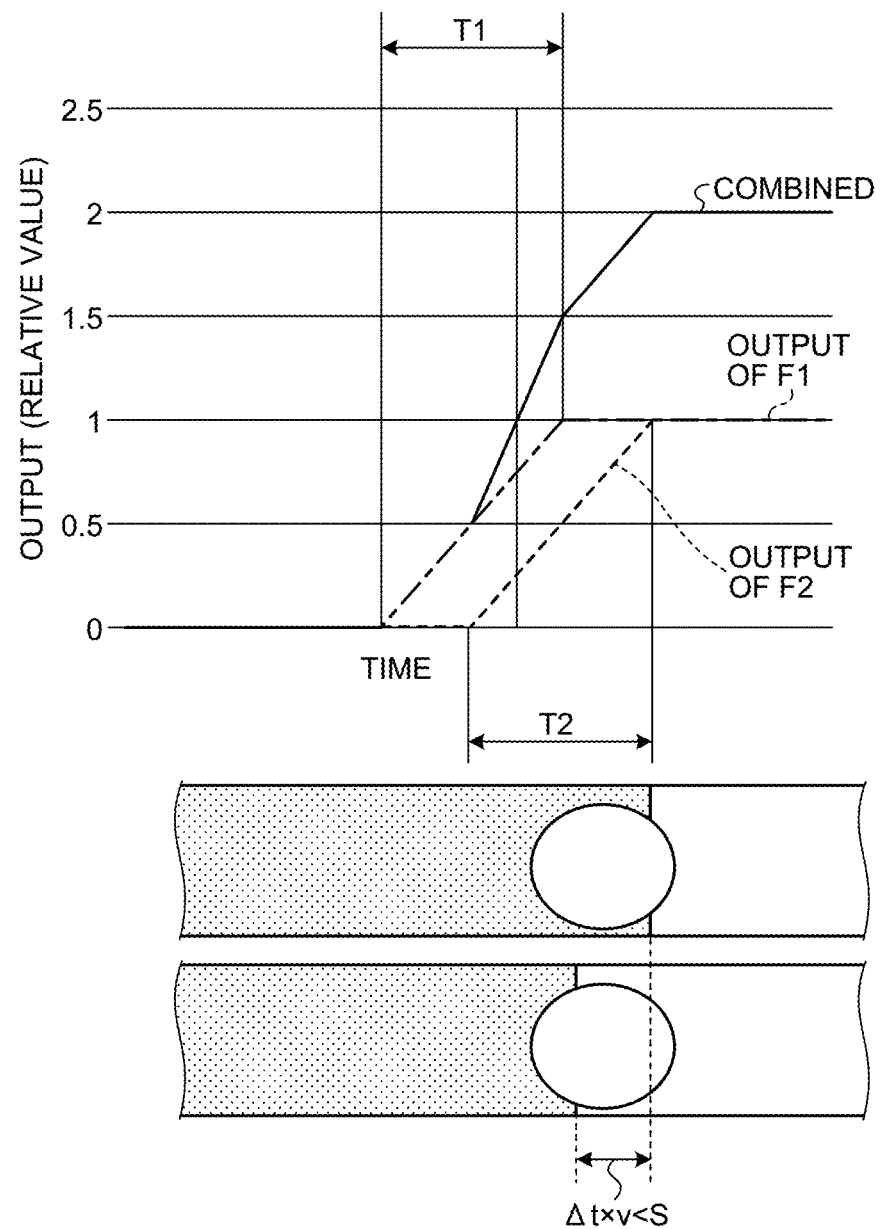
FIG. 8B is a diagram for describing one example of the pattern in which the border of the wavelength conversion element passes the irradiation spot in the projection device according to the first embodiment.

FIG. 8B illustrates a state in which the relative position between the border of the fluorescent wheel F1 and the border of the fluorescent wheel F2 is displaced by approximately a half of the size of the irradiation spot (Δt*v=S/2). In a manner similar to FIG. 8A, the output of the combined fluorescence increases and the color mixing period is 1.5*T1 (=1.5*T2). FIG. 8C illustrates the state in which the relative position between the border of the fluorescent wheel F1 and the border of the fluorescent wheel F2 is displaced by the size of the irradiation spot (Δt*v=S). In a manner similar to FIG. 8A, the output of the combined fluorescence increases and the color mixing period is 2*T1 (=2*T2). Therefore, in the states of FIG. 8A to FIG. 8C, that is, in the range of 0≤Δt<2*T1 (=2*T2), the output of the combined fluorescence in the color mixing period is in the simply increasing state. In addition, by setting Δt in the aforementioned range, the color mixing period (spoke time) can be shortened with respect to the structure including one wavelength conversion element illustrated at (a) in FIG. 6.

FIG. 8D illustrates a state in which the relative position between the border of the fluorescent wheel F1 and the border of the fluorescent wheel F2 is displaced by much more than the size of the irradiation spot (Δt*v>S). The output of the combined fluorescence in the color mixing period tends to increase stepwise and since the color mixing period is more than 2*T1, the light use efficiency decreases. Therefore, by satisfying the range 0≤Δt<2*T1 (=2*T2), that is, the ranges illustrated in FIG. 8A to FIG. 8C, the color mixing period (spoke time) can be shortened sufficiently and the light use efficiency can be increased.

Although the example of controlling the deviation Δt of the rotation signals of the fluorescent wheels F1 and F2 in accordance with the size of the irradiation spot and the relative speed v between the irradiation spot and the fluorescent wheels F1 and F2 has been described above, the timing when the border between the fluorescent body region and the reflection region is irradiated with light in the irradiation spot may be controlled in accordance with the number of segments in the reflection region and the fluorescent body region on the fluorescent wheel, the diameter and rotation speed of the fluorescent wheel, and the spot size.

As described above, the condition of improving the light use efficiency by shortening the color mixing time of the fluorescence and blue light is the conditions illustrated in FIG. 8A to FIG. 8C in which the wavelength conversion elements F1 and F2 are irradiated with the excitation light. These conditions are described based on the relation between the period T1 for which the border between the fluorescent body region 201-1 and the reflection region 202-1 of the fluorescent wheel (wavelength conversion element) F1 is irradiated with the excitation light and the period T2 for which the border between the fluorescent body region 201-2 and the reflection region 202-2 of the fluorescent wheel (wavelength conversion element) F2 is irradiated with the excitation light.

In the condition of FIG. 8A, the period T1 for which the border of the fluorescent wheel (wavelength conversion element) F1 is irradiated with the excitation light and the period T2 for which the border of the fluorescent wheel (wavelength conversion element) F2 is irradiated with the excitation light coincide. In the period T1, the border of the fluorescent wheel F1 and the border of the fluorescent wheel F2 is irradiated with the excitation light. In the condition of FIG. 8B, the start time of the period T2 is earlier than the end time of the period T1, and there is a period where the period T1 and the period T2 overlap. Therefore, in the condition of FIG. 8B, within the period T1 and between the start time of the period T2 and the end time of the period T1, the border of the fluorescent wheel F1 and the border of the fluorescent wheel F2 are irradiated with the excitation light. In the condition of FIG. 8C, the end time of the period T1 and the start time of the period T2 coincide, and at the end time of the period T1, the border of the fluorescent wheel F1 and the border of the fluorescent wheel F2 are irradiated with the excitation light. The conditions of FIG. 8A to FIG. 8C can be regarded as the state in which, in at least a part of the period T1, the border of the fluorescent wheel F1 and the border of the fluorescent wheel F2 are irradiated with the excitation light. That is to say, in the period for which the border between the fluorescent body region (wavelength conversion region) 201 and the reflection region 202 of one fluorescent wheel (wavelength conversion element) included in the fluorescent wheels (wavelength conversion elements) F1 and F2 is irradiated with the light, the light source 21 irradiates the border between the fluorescent body region (wavelength conversion region) 201 and the reflection region 202 of the other wavelength conversion element included in the fluorescent wheels (wavelength conversion elements) F1 and F2 with light.

Here, the preferable conditions of FIG. 8A to FIG. 8C are described based on the case in which there are two fluorescent wheels (wavelength conversion elements F1 and F2); however, as illustrated in FIG. 12A to FIG. 12D, also in the case where one wavelength conversion element is irradiated with the two or more irradiation spots of the excitation light, the similar state can be set by the period T1 of irradiating the border between the fluorescent body region 201-1 and the reflection region 202-1 with the excitation light and the period T2 of irradiating the border between the fluorescent body region 201-2 and the reflection region 202-2 with the excitation light.

First Modification of First Embodiment

Figure 10:
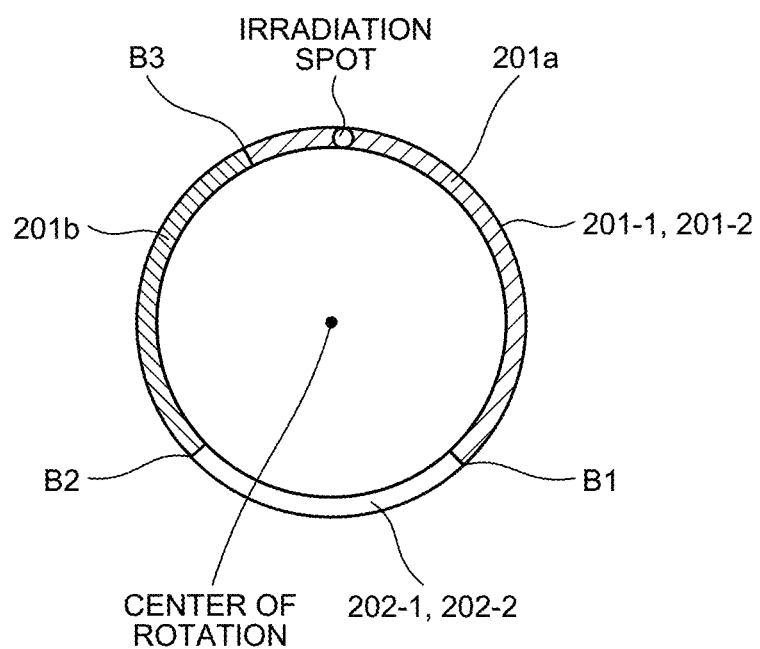
FIG. 10 is a diagram illustrating one example of the structure of the wavelength conversion element in the light source device according to a first modification.

In the first embodiment, the fluorescent wheels F1 and F2 that are the wavelength conversion elements each include the reflection region 202 and the fluorescent body region 201 as illustrated in FIG. 2. Here, the fluorescent body region 201 may be further divided into regions including a plurality of different fluorescent bodies. FIG. 10 is a diagram illustrating one example of the structure of the wavelength conversion element in the light source device according to a first modification. As illustrated in FIG. 10, in the present modification, the fluorescent body region 201 is divided into a fluorescent body region 201a (one example of second region) and a fluorescent body region 201b (one example of first region). In this case, the fluorescent body region 201a may be a fluorescent body that emits green fluorescence (one example of light with a first wavelength) and the fluorescent body region 201b (one example of second region) may be a fluorescent body that emits fluorescence with a yellow wavelength range (one example of light with a second wavelength). By dividing the fluorescent body region 201 of each of the fluorescent wheels F1 and F2 into the fluorescent body regions 201a and 201b emitting different colors in this manner, the fluorescence with different colors can be output from each of the fluorescent wheels F1 and F2.

Here, also at a border B3 between the fluorescent body region 201a and the fluorescent body region 201b of the fluorescent wheels F1 and F2, the color mixing period (spoke time) in which the green fluorescence and the yellow fluorescence mix is generated in a manner similar to the color mixing period generated when borders B1 and B2 between the reflection region 202 and the fluorescent body region 201 are irradiated with (passed by) the irradiation spot of the excitation light. The condition of shortening the color mixing period (spoke time) of the green and yellow fluorescence generated at the border B3 can be set in a manner similar to that in FIG. 8A to FIG. 8C.

As illustrated in FIG. 8A to FIG. 8C, when the period for which the fluorescent body region 201a and the fluorescent body region 201b are irradiated with the irradiation spot on the fluorescent wheel F1 is T1 and the period for which the fluorescent body region 201a and the fluorescent body region 201b are irradiated with the irradiation spot on the fluorescent wheel F2 is T2, the rotation of the fluorescent wheels F1 and F2 is controlled so that there is a period where the period T1 and the period T2 overlap.

That is to say, the fluorescent body region (wavelength conversion region) of the fluorescent wheels F1 and F2 includes the fluorescent body region 201a (one example of first region) emitting the light in a green wavelength range (one example of light with first wavelength), and the fluorescent body region 201b (one example of second region) emitting the light in a yellow wavelength range (one example of light with second wavelength). When the region to be irradiated with the irradiation spot of the excitation light is switched between the fluorescent body region 201a and the fluorescent body region 201b, the fluorescence in the green wavelength range and the fluorescence in the yellow wavelength range are emitted in the time-division manner. In this case, in the period for which the border between the fluorescent body region 201a and the fluorescent body region 201b of the fluorescent wheel F1 is irradiated with the light, the light source 21 irradiates the border B3 between the fluorescent body region 201a and the fluorescent body region 201b of the fluorescent wheel F2 with the light; thus, the color mixing time of the green fluorescence and the yellow fluorescence can be shortened. Accordingly, the light use efficiency can be increased.

Note that the fluorescent body region 201 is divided into the two fluorescent body regions of the fluorescent body region 201a and the fluorescent body region 201b in this example; however, the number of divided fluorescent body regions is not limited to two. For example, the fluorescent body region may be divided into three fluorescent body regions emitting the fluorescence in the red, green, and yellow wavelength ranges. The reflection region 202 may be replaced by the fluorescent body region 201 formed of the fluorescent body emitting blue fluorescence and the blue fluorescence may be emitted by using the light with the shorter wavelength than the blue light (for example, ultraviolet light) as the excitation light.

Second Embodiment

In a second embodiment, the image of the first wavelength conversion region and the image of the second wavelength conversion region are not put adjacent to each other but are overlapped partially or entirely on each other. The structure similar to the first embodiment is not described below.

Figure 11:
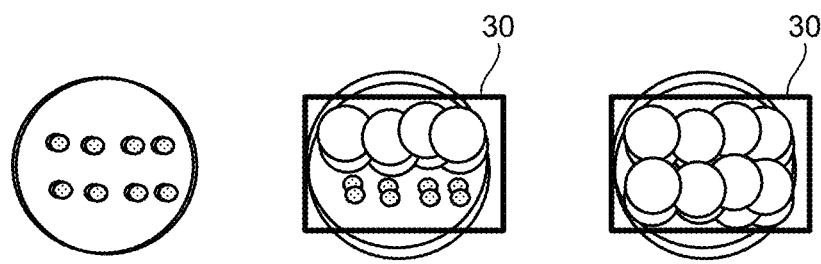
FIG. 11 is a diagram illustrating one example of forming an image for a light homogenizing element in a case where an image of a first wavelength conversion region and an image of a second wavelength conversion region are overlapped on each other completely in a projection device according to a second embodiment.

FIG. 11 is a diagram illustrating one example of forming an image for the light homogenizing element in the case where the image of the first wavelength conversion region and the image of the second wavelength conversion region are overlapped on each other completely in the projection device according to the second embodiment. FIG. 11 illustrates the behavior of the images of the first and the second wavelength conversion light within the time (spoke time) after the border between the fluorescent body region 201-1 and the reflection region 202-1 and the border between the reflection region 202-2 and the fluorescent body region 201-2 start to cross the irradiation spot with the limited size and before these borders exit from the irradiation spot. It is understood that the borders cross in a half time of the spoke time at (a) in FIG. 6.

Here, the effect of shortening the spoke time is maximized when the light source 21 irradiates the first wavelength conversion region A1 and the second wavelength conversion region A2 with light at the same timing. As this irradiation timing is deviated more, the spoke time becomes longer by the length of deviated time, and this time only needs to fall within the time range where the border between the fluorescent body region 201 and the reflection region 202 of the fluorescent wheel crosses the spot light.

In this manner, by the projection device 1 according to the second embodiment, the operation effect similar to that of the first embodiment can be obtained.

Third Embodiment

In a third embodiment, a plurality of irradiation spots are formed for one fluorescent wheel. The structure similar to the above embodiments is not described below.

In the first and the second embodiments, the irradiation spot is provided to each of the two fluorescent wheels (wavelength conversion elements F1 and F2). On the other hand, in the third embodiment, a plurality of irradiation spots (first irradiation spot and second irradiation spot) are generated at the same time on one fluorescent wheel.

Figure 12A:
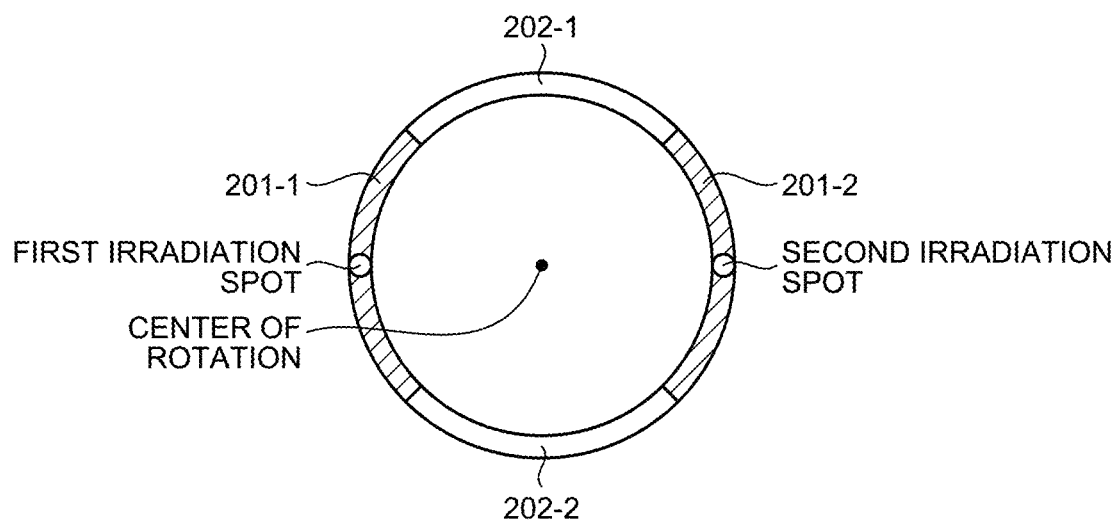
FIG. 12A is a diagram illustrating one example of a structure of a fluorescent wheel in a light source device according to a third embodiment.

FIG. 12A is a diagram illustrating one example of the structure of the fluorescent wheel in the light source device according to the third embodiment. In the present embodiment, along the circumference of the fluorescent wheel, the reflection region 202 and the fluorescent body region 201 are formed for two cycles. That is to say, in the present embodiment, one fluorescent wheel includes the fluorescent body regions 201. The regions are determined so that the time for which the first irradiation spot crosses the border between the reflection region 202-1 and the fluorescent body region 201-1 on one side and the time for which the second irradiation spot crosses the border between the reflection region 202-2 and the fluorescent body region 201-2 on the other side become substantially the same. That is to say, in the present embodiment, on the fluorescent wheel, the fluorescent body region 201 and the reflection region 202 are switched alternately at the irradiation spot and the light with different wavelengths is emitted in the time-division manner. The light source 21 irradiates the border between each of the fluorescent body regions 201 and the reflection region 202 with light at substantially the same timing. In the present embodiment, the fluorescent wheel includes the substrate C including the fluorescent body regions 201, the reflection region 202, and the borders. That is to say, the fluorescent wheel includes the fluorescent body regions 201, the reflection region 202, and the borders on one substrate C.

In this manner, the projection device 1 according to the third embodiment eliminates the necessity of synchronizing the two fluorescent wheels; therefore, the control between the two fluorescent wheels becomes unnecessary.

First Example

In the first example, a plurality of sets of reflection regions and fluorescent body regions are formed on two bands provided along a direction from the center of rotation of the fluorescent wheel to the outer diameter. The structure similar to the third embodiment is not described below.

Figure 12B:
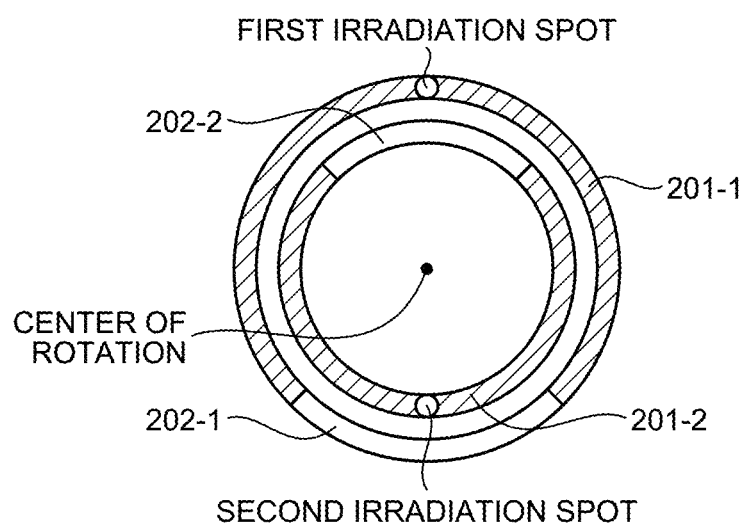
FIG. 12B is a diagram illustrating one example of a structure of a fluorescent wheel in a light source device according to a first example.
Figure 12C:
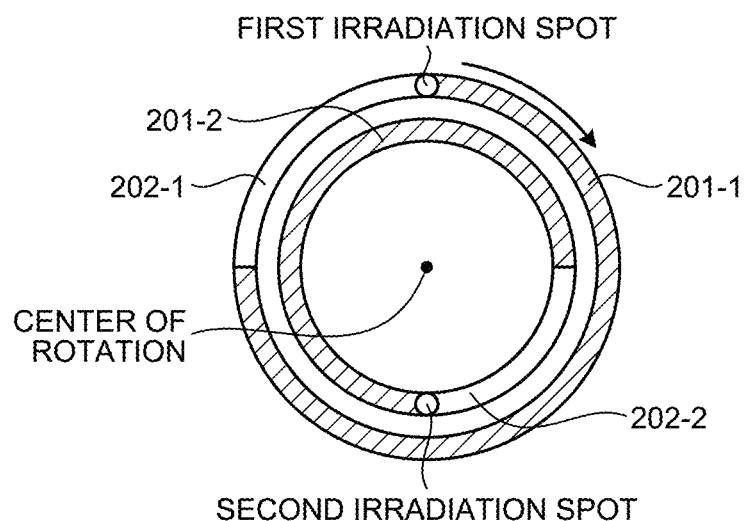
FIG. 12C is a diagram illustrating one example of the structure of the fluorescent wheel in the light source device according to the first example.
Figure 12D:
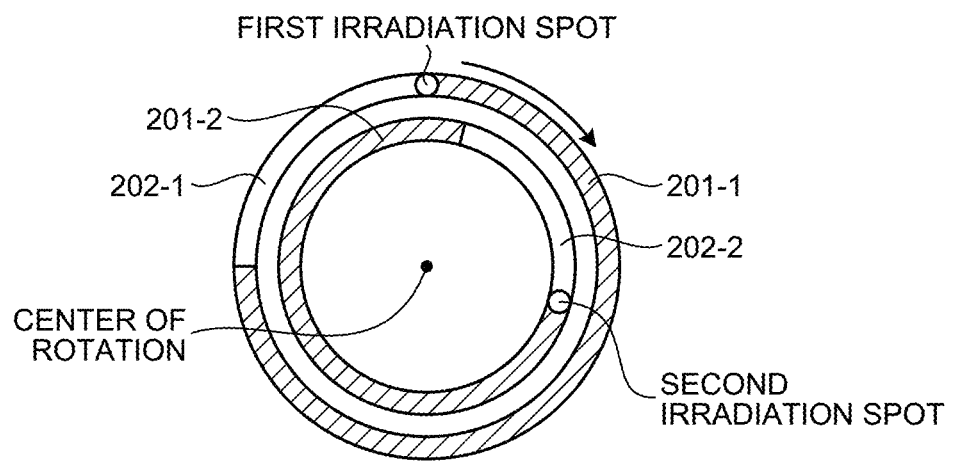
FIG. 12D is a diagram illustrating one example of the structure of the fluorescent wheel in the light source device according to the first example.

FIG. 12B to FIG. 12D are diagrams each illustrating one example of the structure of the fluorescent wheel in the light source device according to the first example. In the present example, on the fluorescent wheel, the reflection region 202 and the fluorescent body region 201 are formed on each of two bands provided along the direction from the center of rotation of the fluorescent wheel to the outer diameter as illustrated in FIG. 12B. That is to say, in the present example, in a manner similar to the third embodiment, one fluorescent wheel includes the fluorescent body regions 201. As illustrated in FIG. 12C and FIG. 12D, each region is determined so that the time for which the first irradiation spot crosses the border between the reflection region 202-1 and the fluorescent body region 201-1 on one side and the time for which the second irradiation spot crosses the border between the reflection region 202-2 and the fluorescent body region 201-2 on the other side become substantially the same.

FIG. 12C illustrates the state in which the first irradiation spot and the second irradiation spot each cross the border between the reflection region 202 and the fluorescent body region 201. That is to say, in the fluorescent wheel in the present example, the fluorescent body region 201 and the reflection region 202 are switched alternately in the irradiation spot and the light with different wavelengths is emitted in the time-division manner. Then, the light source 21 irradiates the border between each of the fluorescent body regions 201 and the reflection region 202 with the light at substantially the same timing. In the present example, the fluorescent wheel includes the substrate C including the fluorescent body regions 201, the reflection region 202, and the borders. That is to say, the fluorescent wheel includes the fluorescent body regions 201, the reflection region 202, and the borders on one substrate C.

In the fluorescent wheel illustrated in FIG. 12B and FIG. 12C, the positions of the first and the second irradiation spots are set at, but not limited to, the positions having the center of rotation of the fluorescent wheel therebetween. For example, the borders between the fluorescent body regions 201 and the reflection regions 202 do not need to be provided at the symmetric position with respect to the center of rotation of the fluorescent wheel as illustrated in FIG. 12D and the positions of the first and the second irradiation spots can be set freely to a certain degree. The border between the fluorescent body region 201 and the reflection region 202 may be determined in accordance with the layout of the optical system that forms the first and the second irradiation spots.

On the other hand, in the projection device 1 according to the above embodiments, regarding the time of crossing the border between each of the fluorescent body regions 201 and the reflection region 202, the physical positional error when the fluorescent body regions 201 and the reflection region 202 are formed is not zero; therefore, simply assembling may fail to match the timing. In order to avoid this, in the manufacture of devices, for example, the timing of driving the light source 21 may be adjusted in the manufacture by monitoring the emission light from the light source 21. In this case, the amount of adjusting the timing of driving the light source 21 is recorded in a separate memory or the like to be mounted in the projection device 1. Then, by reading the adjustment amount from the memory at the start of the projection device 1 and controlling the timing of driving the light source 21 in accordance with the adjustment amount, the timing of crossing the border between each of the fluorescent body regions 201 and the reflection region 202 can be matched correctly.

In this manner, in the projection device 1 in the first example, it is only necessary to control the rotation speed of the fluorescent wheel to be the same rotation speed as when the fluorescent wheels are used; thus, the control is simplified. Moreover, when the light source device 20 according to the present example is used in the projection device 1, synchronous control with the color wheel or another light source is necessary but since the necessary fluorescent wheel is just one, the control is easy. Furthermore, the degree of freedom about the place where the border between the fluorescent body region 201 and the reflection region 202 is set on the substrate C is increased and the degree of freedom about the positions of the first and the second irradiation spots and the layout of the projection device 1 can be improved.

Note that the timing of irradiating the borders between the fluorescent body regions 201 and the reflection regions 202 with the irradiation spots of the excitation light depends on the position accuracy of the irradiation spots, and the position accuracy of the borders between the fluorescent body regions 201-1 and 201-2 and the reflection regions 202-1 and 202-2 on the fluorescent wheel. The light source device 20 according to the present embodiment is preferably configured to irradiate the border between the fluorescent body region 201-2 and the reflection region 202-2 with the irradiation spot in at least a part of the period for which the irradiation spot irradiates the border between the fluorescent body region 201-1 and the reflection region 202-1 with the light. Thus, the color mixing period (spoke time) of the combined light emitted from the light source device 20 can be shortened.

In the present example, in a manner similar to the first modification of the first embodiment, each of the fluorescent body regions 201-1 and 201-2 may be divided into the fluorescent body region 201a and the fluorescent body region 201b as illustrated in FIG. 10. In this case, the light source device 20 may be configured to irradiate the border B3 between the fluorescent body region 201a and the fluorescent body region 201b with the irradiation spot of the excitation light at the timing in the range as illustrated in FIG. 8A to FIG. 8C. Thus, the color mixing period (spoke time) of the fluorescence can be shortened and accordingly, the light use efficiency of the light source device 20 can be increased.

Fourth Embodiment

In a fourth embodiment, the light source device includes one light source unit, and the light emitted from the light source unit is divided and the first wavelength conversion region and the second wavelength conversion region are irradiated therewith. The structure similar to the above embodiments is not described below.

Figure 13:
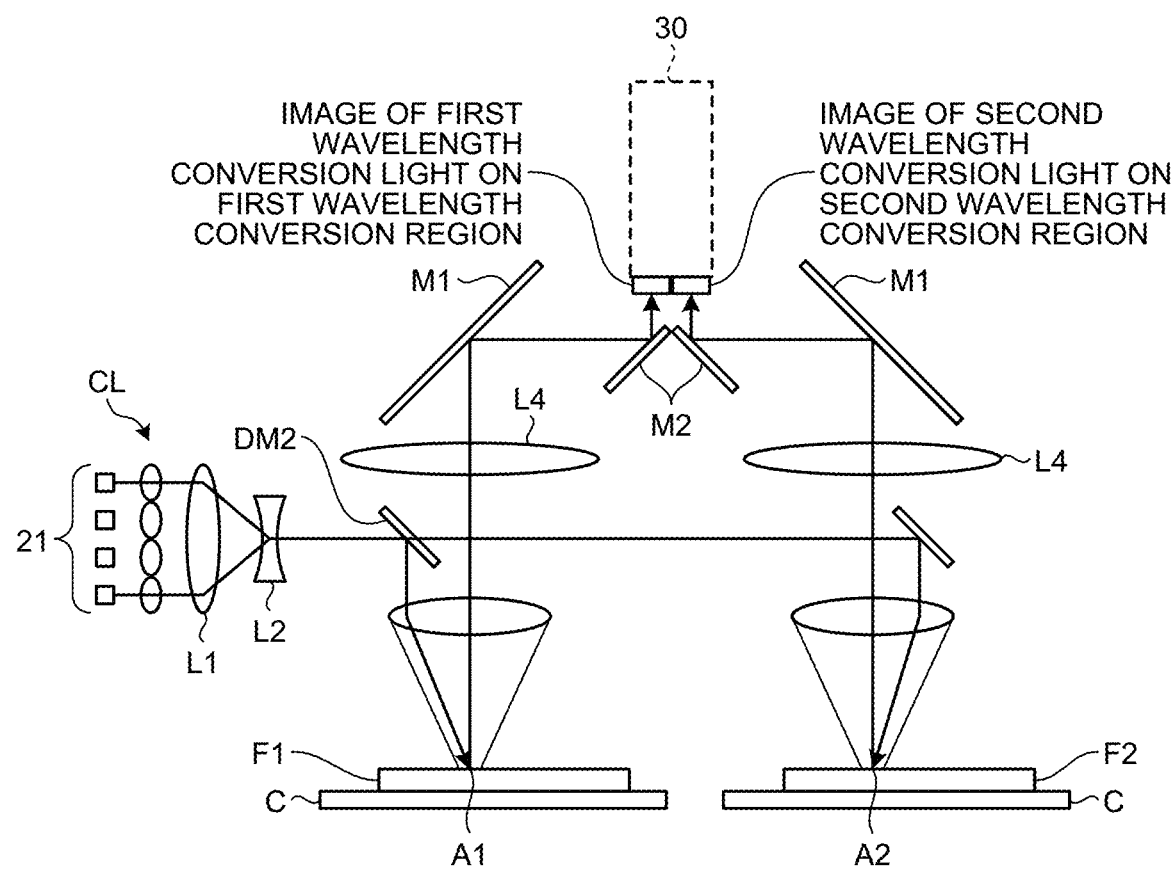
FIG. 13 is a diagram for describing one example of a formation process for an image of wavelength conversion light in a light source device according to a fourth embodiment.

FIG. 13 is a diagram for describing one example of a formation process for an image of wavelength conversion light in the light source device according to the fourth embodiment. In the present embodiment, the light source light emitted from the light source 21 including 4*4 LDs in one light source unit is condensed by the condensing elements L1 and L2, and by the dichroic mirror DM2 (one example of dividing unit), the light source light is divided so that the power of the light source light becomes a half. The wavelength conversion elements F1, F2 are irradiated with the light source light resulting from the division by the dichroic mirror DM2 in a manner similar to the aforementioned embodiments. In the present embodiment, the first wavelength conversion region A1 and the second wavelength conversion region A2 of the wavelength conversion elements F1 and F2 are stationary. Thus, since the driving unit that rotates and moves the first wavelength conversion region A1 and the second wavelength conversion region A2 becomes unnecessary, the light source device 20 with high reliability can be achieved.

Since the projection device 1 according to the fourth embodiment includes one light source unit that irradiates the wavelength conversion elements F1 and F2 with the light source light, it becomes unnecessary to synchronize the irradiation timings to irradiate the wavelength conversion elements F1 and F2 with the light source light from the light sources 21.

Fifth Embodiment

In a fifth embodiment, the light source that emits the excitation light is mainly used as the light source unit for wavelength conversion, and another light source unit that uses the light emitted from the light source without wavelength conversion is also employed. The structure similar to the above embodiments is not described below.

FIG. 14 is a diagram illustrating one example of the structure of the light source device according to the fifth embodiment. The light source device 20 according to the present embodiment includes a plurality of (in the present embodiment, two) excitation light sources of a first excitation light source 101-1 and a second excitation light source 101-2 as illustrated in FIG. 14. The excitation light emitted from the first excitation light source 101-1 and the second excitation light source 101-2 is guided to the wavelength conversion element F1 and the wavelength conversion element F2 by the dichroic mirrors DM1 and DM2, and forms the irradiation spots. The first wavelength conversion region A1 of the wavelength conversion element F1 forms, by the first optical system 501, the image of the first wavelength conversion region A1 (in other words, the image of the first wavelength conversion light in the first wavelength conversion region A1). Moreover, the second wavelength conversion region A2 of the wavelength conversion element F2 forms, by the second optical system 502, the image of the second wavelength conversion region A2 (in other words, the image of the second wavelength conversion light in the second wavelength conversion region A2). The image of the first wavelength conversion region A1 and the image of the second wavelength conversion region A2 are put adjacent to or superimposed on each other, so that one image is formed.

The wavelength conversion element F1 and the wavelength conversion element F2 are the fluorescent bodies disposed on the substrate C, and the light is converted into the light with yellow, green, or red wavelength, for example, by the excitation light. It has been said that in the wavelength conversion elements F1 and F2 having received the excitation light emitted from the first excitation light source 101-1 and the second excitation light source 101-2, not the entire energy of the excitation light is converted into the light with yellow wavelength or the like and a part of the energy becomes heat and deteriorates the wavelength conversion efficiency. Therefore, the light source device 20 according to the present embodiment includes heat dissipation members (heat sinks) H1 and H2 that release heat through the substrate C with respect to the wavelength conversion elements F1 and F2. In the light source device 20 according to the present embodiment, the heat dissipation members H1 and H2 may be in direct contact with the wavelength conversion elements F1 and F2 (fluorescent bodies) or the heat dissipation members H1 and H2 may be closely attached (bonded) thereto with a thermal conductive grease or the like in order to minimize the thermal resistance.

In the light source device 20 according to the present embodiment, the wavelength conversion region to be irradiated with the excitation light from the first excitation light source 101-1 and the second excitation light source 101-2 is not one but separate wavelength conversion regions (first wavelength conversion region A1 and second wavelength conversion region A2). Thus, the heat dissipation effect of the wavelength conversion elements F1 and F2 is improved and the wavelength conversion efficiency is also improved. In this case, the first wavelength conversion region A1 and the second wavelength conversion region A2 are not moved but fixed, and the excitation light sources irradiate the first wavelength conversion region A1 and the second wavelength conversion region A2 with the excitation light at the same timing.

The light source device 20 according to the present embodiment includes a light source 102 that emits blue light in addition to the first excitation light source 101-1 and the second excitation light source 101-2, and for example, these light sources are combined (structured) so that the light intersects with the image formation optical path of the fluorescence in the dichroic mirror DM1. The dichroic mirror DM1, which is also used as a reflection mirror for the excitation light source, may be a separate body alternatively.

Figure 15B:
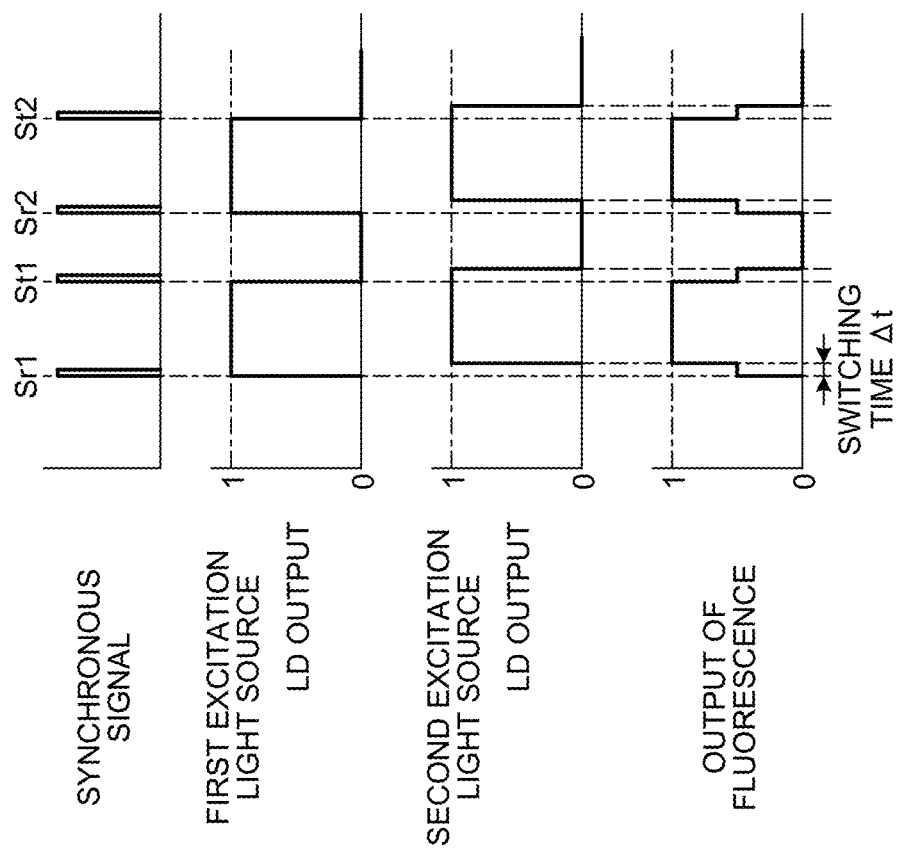
FIGS. 15A and 15B are diagrams for describing examples of the output driving timing for the excitation light from the first and the second excitation light sources and the light-emitting timing for the fluorescence emitted from the wavelength conversion element in a projection device according to the fifth embodiment.
Figure 15A:
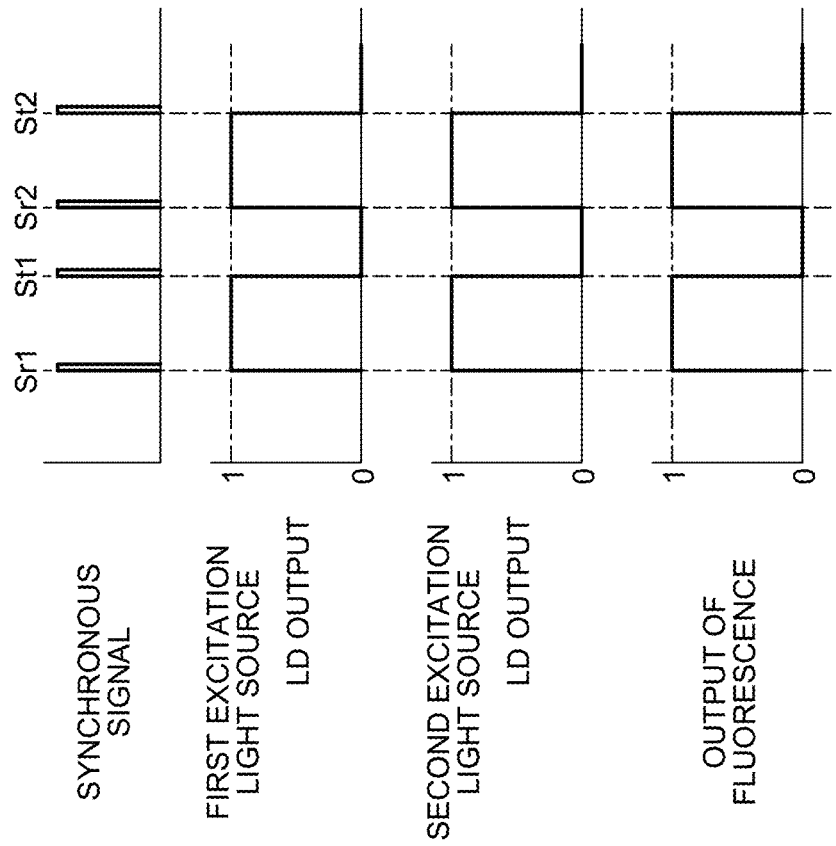

FIGS. 15A and 15B are diagrams for describing examples of the output driving timing for the excitation light from the first and the second excitation light sources and the light-emitting timing for the fluorescence emitted from the wavelength conversion element in the projection device according to the fifth embodiment.

The first excitation light source 101-1 and the second excitation light source 101-2 start to emit the excitation light (LD output) in accordance with a trigger signal Sr1 of starting the light emission. That is to say, the first excitation light source 101-1 controls the light emission of the excitation light by matching the timing (output driving timing) in synchronization with this trigger signal Sr1. FIG. 15A is a time chart expressing the LD output of the excitation light from each excitation light source when the timings (output driving timings) of the first excitation light source 101-1 and the second excitation light source 101-2 coincide and the output of the fluorescence from the wavelength conversion elements F1 and F2. The period from the trigger signal Sr1 to the next trigger signal Sr2 corresponds to one frame. As illustrated in FIG. 15A, if the output driving timings of the excitation light from the first excitation light source 101-1 and the second excitation light source 101-2 are in synchronization, the start and stop of the output of the fluorescence from the wavelength conversion elements F1 and F2 are performed instantly.

However, in a case where the output driving timings of the first excitation light source 101-1 and the second excitation light source 101-2 are deviated by a very small time difference Δt, the output of fluorescence from the first wavelength conversion region A1 and the second wavelength conversion region A2 becomes stepwise by the time difference Δt as illustrated in FIG. 15B. This time difference Δt corresponds to the spoke time when the light is switched from the fluorescence to another color (for example, blue light). This time difference Δt can be made substantially zero by the adjustment of the output driving timing or may be delayed as necessary. Originally, the color mixing occurs for the spoke time. In the case of increasing the color purity, it is desirable that the light source is turned off or the display is turned off in the spoke time so that the spoke time is made as short as possible. However, depending on the application, the color mixing is performed on purpose and in this case, the time difference Δt is extended sufficiently long to cause the color mixing. In this case, the border between one color and the mixed color becomes the spoke time and this time can be minimized by the present technique.

In this manner, in the projection device 1 according to the fifth embodiment, the wavelength conversion region to be irradiated with the excitation light from the first excitation light source 101-1 and the second excitation light source 101-2 is not one but separate wavelength conversion regions (first wavelength conversion region A1 and second wavelength conversion region A2). Thus, the heat dissipation effect of the wavelength conversion elements F1 and F2 can be improved and the wavelength conversion efficiency can also be improved.

Sixth Embodiment

In a sixth embodiment, the excitation light emitted from the excitation light source is divided into a plurality of divisional excitation light and one wavelength conversion element is irradiated with one divisional excitation light and the other wavelength conversion element is irradiated with the other divisional excitation light. The structure similar to the above embodiments is not described below.

FIG. 16 is a diagram illustrating one example of the structure of the light source device according to the sixth embodiment. In the present embodiment, the output (power) of the excitation light from the excitation light source 101 is twice the output of the excitation light from the first excitation light source 101-1 and the second excitation light source 101-2 in the light source device 20 according to the fifth embodiment. In the present embodiment, the excitation light emitted from the excitation light source 101 is divided into two divisional excitation light through the dichroic mirrors DM1 and DM2 (one example of division unit). The separate wavelength conversion elements F1 and F2 (first wavelength conversion region A1, second wavelength conversion region A2) are irradiated with one and the other of the divisional excitation light. Thus, the serial driving for suppressing the deviation in the output driving timing between the excitation light sources is not necessary and the light emission of the excitation light source 101 can be started and stopped with the power wire for driving with a simple structure. As a result, the time difference Δt is not generated at the timing of emitting the fluorescence from the wavelength conversion elements F1 and F2 and the fluorescence with high wavelength conversion efficiency and sharp fluorescence can be obtained.

The light source device 20 according to the present embodiment includes the light source 102 emitting blue light in addition to the excitation light source 101, and for example, these light sources are combined (structured) so that the light intersects with the image formation optical path of the fluorescence in the dichroic mirror DM1. The dichroic mirror DM1, which is also used as a reflection mirror for the excitation light source 101, may be a separate body alternatively. The light source 102 provided in addition to the excitation light source 101 is not limited to the blue light source and may be the green or red light source.

Figure 17A:
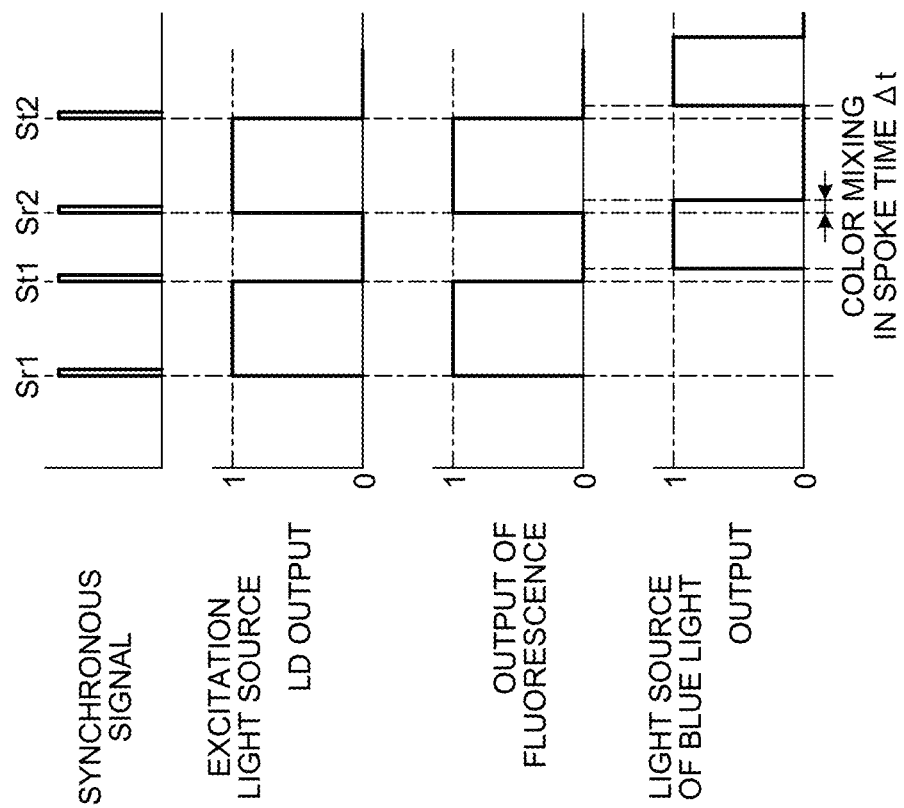
FIGS. 17A and 17B are diagrams for describing examples of the output light driving timing of the excitation light from the excitation light source and the light-emitting timing for fluorescence (for example, blue or red laser light) emitted from the wavelength conversion element in the light source device according to the sixth embodiment.
Figure 17B:
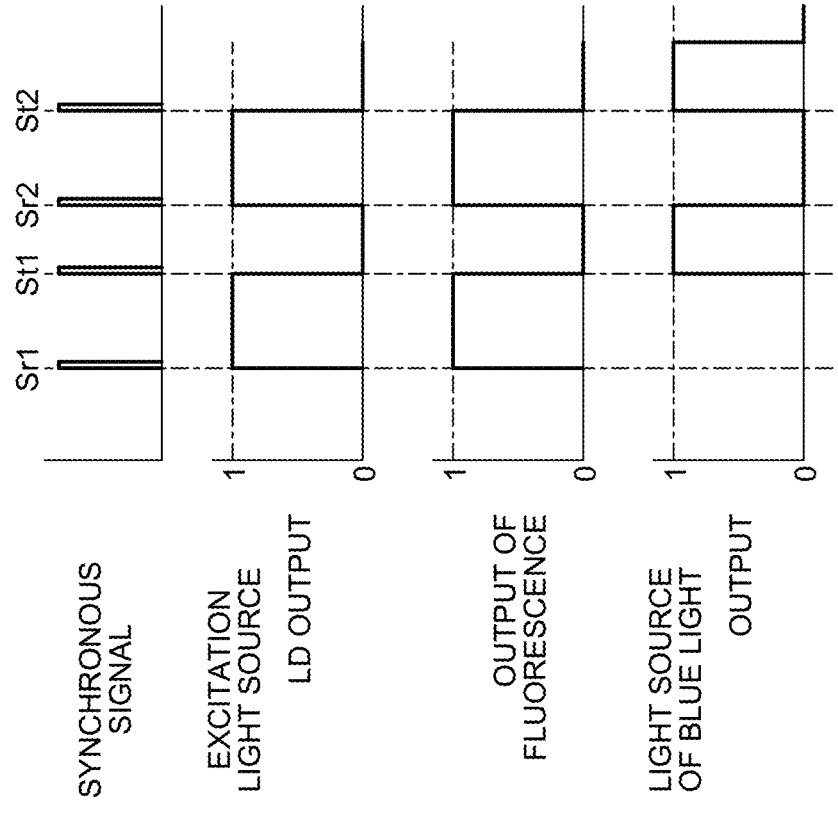

FIGS. 17A and 17B are diagrams for describing examples of the output light driving timing of the excitation light from the excitation light source, and the light-emitting timing for fluorescence (for example, blue or red laser light) emitted from the wavelength conversion element in the light source device according to the sixth embodiment.

The excitation light source 101 starts to emit (output) the excitation light in accordance with the trigger signal Sr1 for starting the light emission. That is to say, the excitation light source 101 matches the timings (output driving timings) in synchronization with this trigger signal Sr1 and controls the light emission of the excitation light. In the case of stopping the output of the fluorescence from the wavelength conversion elements F1 and F2 and outputting the light from another light source 102, the light source device 20 according to the present embodiment stops the output of the excitation light from the excitation light source 101 by a driving stop signal St1 for the excitation light. Alternatively, the light source device may stop the output of the fluorescence from the wavelength conversion elements F1 and F2 after the elapse of a certain time from the output of the trigger signal Sr1. On the other hand, the light source 102 emitting the blue light controls to start to emit the blue light using, as the trigger, the driving stop signal St1 for the excitation light or the emission start signal from the controller that outputs the driving stop signal St.

Here, if the time difference Δt is generated between the timing when the excitation light source 101 stops the emission of the excitation light and the timing when the light source 102 starts to emit the blue light, the color mixing occurs between the fluorescence emitted from the wavelength conversion elements F1 and F2 and the light (for example, blue light) from another light source 102 as illustrated in FIG. 17B. This time difference Δt is the time corresponding to the spoke time when the color is switched as described in the above embodiments, and if the time difference Δt is generated, the color mixing time increases in accordance with the time difference Δt and the color purity decreases. In this case, the control not to perform the display by turning off the light source by the amount of time difference Δt is necessary and the light use efficiency decreases drastically. Therefore, by controlling the timings of driving the excitation light source 101 and driving the other light source 102, the light source device 20 according to the present embodiment can suppress the decrease in light use efficiency.

Thus, by the projection device 1 according to the sixth embodiment, the serial driving for suppressing the deviation in the output driving timing between the excitation light sources is unnecessary and the light emission of the excitation light source 101 can be started and stopped with the power wire for driving with a simple structure. As a result, the time difference Δt is not generated at the timing of emitting the fluorescence from the wavelength conversion elements F1 and F2 and the fluorescence with high wavelength conversion efficiency and sharp fluorescence can be obtained.

FIG. 18 and FIG. 19 are diagrams for describing examples of a formation method for an image of the wavelength conversion region by the light source device according to the present embodiment. In the example in the above embodiment in which the light source device 20 includes two sets of wavelength conversion light source units, the moving direction of the fluorescent wheels (wavelength conversion elements F1 and F2) relative to the irradiation spots is determined so that the images (fluorescence, or light source light) of the secondary light sources (first wavelength conversion region A1, second wavelength conversion region A2) formed by the wavelength conversion light source units A and B are arranged vertically as illustrated in FIG. 6. However, as illustrated in FIG. 18, the moving direction of the fluorescent wheel relative to the irradiation spot may be a lateral direction. For example, the image of the wavelength conversion light may be rotated by 90° by reflection using a mirror or the like in an optical path to the conjugated position; for example, the incidence direction to the fluorescent wheel is determined using the reflection mirror or the like.

Although the light source device 20 according to the present embodiment includes the two wavelength conversion light source units A and B, two or more (three or four) wavelength conversion light source units may be provided alternatively. For example, the light source device 20 may include four light sources in the 2*2 arrangement, four wavelength conversion regions, or four fluorescent wheels (wavelength conversion elements) as illustrated in FIG. 19. Alternatively, the light source device 20 may include two sets of fluorescent wheels (see FIGS. 12A to 12D) including two or more segments of the fluorescent body regions 201 and the reflection regions 202, and by using the four fluorescent body regions 201 and four optical systems for forming the images, four images can be formed as one image. In this case, the light source device 20 only needs to make the border parts between the four fluorescent body regions 201 and the reflection regions 202 pass the position of the light condensing spot of the excitation light as illustrated in FIG. 19. Depending on the direction where the border part passes, the spoke time is shortened by the number of provisions. The image of the wavelength conversion light may be set in various directions and the direction in FIG. 19 is just one example.

As described above, by the provision of the wavelength conversion light source units, the size of the respective wavelength conversion regions can be made small and the receiving excitation light power can also be reduced; therefore, the ratio of the wavelength conversion light per irradiation energy can be increased. That is to say, the conversion efficiency can be increased. Although not illustrated, the projection device for irradiating the spatial modulator and magnifying and projecting the information formed on the spatial modulator with a projection lens or the like, if including the aforementioned light source device, can have higher brightness and higher efficiency.

An embodiment provides the advantageous effect that the light use efficiency of the light source can be increased and the brighter light can be emitted.

The above-described embodiments are illustrative and do not limit the present invention. Thus, numerous additional modifications and variations are possible in light of the above teachings. For example, at least one element of different illustrative and exemplary embodiments herein may be combined with each other or substituted for each other within the scope of this disclosure and appended claims. Further, features of components of the embodiments, such as the number, the position, and the shape are not limited the embodiments and thus may be preferably set. It is therefore to be understood that within the scope of the appended claims, the disclosure of the present invention may be practiced otherwise than as specifically described herein.

What is claimed is:

1. A light source device comprising:
a light source;
a plurality of wavelength converters each including a wavelength conversion region to receive light emitted from the light source and emit light with a wavelength different from a wavelength of the received light; and
a plurality of optical structures to form images of wavelength conversion regions of the plurality of wavelength converters, wherein
the light source irradiates the wavelength converters with light at a same timing,
the plurality of optical structures cause the images of the wavelength conversion regions of the plurality of wavelength converters to be adjacent to or superimposed on each other,
at least two wavelength converters among the plurality of wavelength converters each include the wavelength conversion region and a non-conversion region to emit the light received from the light source without conversion of the wavelength, and at a position to be irradiated with the light from the light source, the wavelength conversion region and the non-conversion region are alternately switched to emit the light with different wavelengths in a time-division manner, and
the light source, in a period for which a border between the wavelength conversion region and the non-conversion region of one of the at least two wavelength converters is irradiated with the light, irradiates the border between the wavelength conversion region and the non-conversion region of another of the at least two wavelength converters with the light, and
the light source includes a plurality of excitation light sources each to irradiate one of the wavelength conversion regions with light at a same timing.

2. The light source device according to claim 1, wherein wavelength conversion regions included in at least two wavelength converters among the plurality of wavelength converters each include a first region to emit light with a first wavelength and a second region to emit light with a second wavelength different from the first wavelength, and at a position to be irradiated with the light from the light source, the first region and the second region are switched to emit the light with the first wavelength and the light with the second wavelength in a time-division manner, and the light source, in a period for which a border between the first region and the second region of one of the at least two wavelength converters is irradiated with the light irradiates the border between the first region and the second region of another of the at least two wavelength converters with the light.

3. The light source device according to claim 1, further comprising a divider to divide the light emitted from the light source and irradiate the wavelength conversion regions with the divided light at a same time.

4. The light source device according to claim 1, wherein the light source includes an excitation light source to irradiate the wavelength conversion regions with excitation light and a light source to emit light having a wavelength not converted by the wavelength conversion region.

5. The light source device according to claim 4, wherein the wavelength conversion regions are stationary.

6. The light source device according to claim 4, further comprising a divider to divide the excitation light emitted from the excitation light source into a plurality of divisional excitation light and irradiate the wavelength conversion regions with the plurality of divisional excitation light.

7. A projection device comprising:
a spatial modulator to turn on and off light for each pixel of the images of the wavelength conversion regions formed by the light source device according to claim 1, to form an image; and
a projection optical structure to magnify the image formed by the spatial modulator and project the magnified image onto a projection surface.

8. A light source device comprising:
a light source;
a wavelength converter including a plurality of wavelength conversion regions each to receive light emitted from the light source and emit light with a wavelength different from a wavelength of the received light; and
a plurality of optical structures to form images of the plurality of wavelength conversion regions, wherein
the light source irradiates the plurality of wavelength conversion regions with light at a same timing, and
the plurality of optical structures cause the images of the plurality of wavelength conversion regions to be adjacent to or superimposed on each other,
the wavelength converter further includes a non-conversion region to emit the light received from the light source without conversion of the wavelength, and at a position to be irradiated with the light from the light source, the wavelength conversion region and the non-conversion region are switched alternately to emit light with different wavelengths in a time-division manner, and
the light source, in a period for which a border between one of the plurality of wavelength conversion regions and the non-conversion region is irradiated with the light, irradiates the border between another of the plurality of wavelength conversion regions and the non-conversion region with the light.

9. The light source device according to claim 8, wherein the wavelength converter includes a substrate including the plurality of wavelength conversion regions, the non-conversion region, and the borders.

10. The light source device according to claim 8, further comprising a divider to divide the light emitted from the light source and irradiate the plurality of wavelength conversion regions with the divided light at a same time.

11. The light source device according to claim 8, wherein the light source includes a plurality of excitation light sources each to irradiate one of the plurality of wavelength conversion regions with light at a same timing.

12. The light source device according to claim 8, wherein the light source includes an excitation light source to irradiate the plurality of wavelength conversion regions with excitation light and a light source to emit light having a wavelength not converted by the wavelength conversion region.

13. The light source device according to claim 12, wherein the plurality of wavelength conversion regions are stationary.

14. The light source device according to claim 12, further comprising a divider to divide the excitation light emitted from the excitation light source into a plurality of divisional excitation light and irradiate the plurality of wavelength conversion regions with the plurality of divisional excitation light.

15. A projection device comprising:
a spatial modulator to turn on and off light for each pixel of the images of the plurality of wavelength conversion regions formed by the light source device according to claim 8, to form an image; and
a projection optical structure to magnify the image formed by the spatial modulator and project the magnified image onto a projection surface.

16. A light source device comprising:
a light source;
a wavelength converter including a plurality of wavelength conversion regions each to receive light emitted from the light source and emit light with a wavelength different from a wavelength of the received light; and
a plurality of optical structures to form images of the plurality of wavelength conversion regions, wherein
the light source irradiates the plurality of wavelength conversion regions with light at a same timing,
the plurality of optical structures cause the images of the plurality of wavelength conversion regions to be adjacent to or superimposed on each other,
the plurality of wavelength conversion regions each include a first region to emit light with a first wavelength and a second region to emit light with a second wavelength different from the first wavelength, and at a position to be irradiated with the light from the light source, the first region and the second region are switched to emit the light with the first wavelength and the light with the second wavelength in a time-division manner, and
the light source, in a period for which a border between the first region and the second region of one of the plurality of wavelength conversion regions is irradiated with the light, irradiates the border between the first region and the second region of another of the plurality of wavelength conversion regions with the light.

17. The light source device according to claim 16, further comprising a divider to divide the light emitted from the light source and irradiate the plurality of wavelength conversion regions with the divided light at a same time.

18. The light source device according to claim 16, wherein the light source includes a plurality of excitation light sources each to irradiate one of the plurality of wavelength conversion regions with light at a same timing.

19. The light source device according to claim 16, wherein the light source includes an excitation light source to irradiate the plurality of wavelength conversion regions with excitation light and a light source to emit light having a wavelength not converted by the wavelength conversion region.

20. A projection device comprising:
a spatial modulator to turn on and off light for each pixel of the images of the plurality of wavelength conversion regions formed by the light source device according to claim 16, to form an image; and
a projection optical structure to magnify the image formed by the spatial modulator and project the magnified image onto a projection surface.

\* \* \* \* \*